United States Patent
Choi

(10) Patent No.: US 10,846,221 B2
(45) Date of Patent: Nov. 24, 2020

(54) MEMORY SYSTEM CAPABLE OF EFFECTIVELY STORING A PLURALITY OF WRITE DATA GROUPED INTO A TRANSACTION AND OPERATING METHOD THEREOF

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/385,755

(22) Filed: Apr. 16, 2019

(65) Prior Publication Data

US 2020/0019503 A1    Jan. 16, 2020

(30) Foreign Application Priority Data

Jul. 16, 2018  (KR) .................. 10-2018-0082622

(51) Int. Cl.
*G06F 12/0804* (2016.01)

(52) U.S. Cl.
CPC .. *G06F 12/0804* (2013.01); *G06F 2212/1032* (2013.01)

(58) Field of Classification Search
None
See application file for complete search history.

(56) References Cited

U.S. PATENT DOCUMENTS

| 9,372,632 | B2 | 6/2016 | Lassa | |
| 2008/0120470 | A1* | 5/2008 | Dhamankar | G06F 12/0804 711/135 |
| 2009/0055155 | A1* | 2/2009 | Klein | G06F 30/33 703/22 |
| 2015/0254188 | A1* | 9/2015 | Yano | G06F 12/126 711/3 |
| 2017/0024132 | A1 | 1/2017 | Jun et al. | |
| 2017/0060788 | A1 | 3/2017 | Chang et al. | |
| 2018/0276085 | A1* | 9/2018 | Mitkar | G06F 3/065 |
| 2018/0329651 | A1* | 11/2018 | Chang | G06F 12/0895 |
| 2019/0043540 | A1* | 2/2019 | Chagam Reddy | G11C 7/10 |
| 2019/0332315 | A1* | 10/2019 | Oravivattanakul | G06F 3/0604 |

* cited by examiner

*Primary Examiner* — Edward J Dudek, Jr.
*Assistant Examiner* — Ralph A Verderamo, III
(74) *Attorney, Agent, or Firm* — IP & T Group LLP

(57) ABSTRACT

A memory system includes a write buffer and a controller. The controller, when, among write data, first write data which are grouped into a transaction are inputted to the write buffer, receives total size information of a transaction for completion of commit of the first write data. The controller checks, at a time of performing an actual flush operation for the write buffer check, in the case where it is determined that commit-uncompleted first write data are included in the write buffer, a size of a space left in the write buffer by simulating a flush operation with the commit-uncompleted first write data excluded from the simulated flush operation, compares a checked size of the space left in the write buffer and the total size information, and determines whether to include the commit-uncompleted first write data in the actual flush operation depending on a comparison result.

20 Claims, 21 Drawing Sheets

NO NMAL_WDATA TO BE EXCLUDED IN FLUSH

NO NMAL_WDATA TO BE EXCLUDED IN FLUSH

NO NMAL_WDATA TO BE EXCLUDED IN FLUSH

MEMORY SYSTEM CAPABLE OF EFFECTIVELY STORING A PLURALITY OF WRITE DATA GROUPED INTO A TRANSACTION AND OPERATING METHOD THEREOF

CROSS-REFERENCE TO RELATED APPLICATION

This application claims priority under 35 U.S.C. § 119 to Korean Patent Application No. 10-2018-0082622, filed on Jul. 16, 2018, which is incorporated herein by reference in its entirety.

BACKGROUND

1. Field

Various embodiments relate to a memory system and, more particularly, to a memory system which stores a plurality of write data grouped into a transaction.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of effectively storing a plurality of write data grouped into a transaction.

In an embodiment, a memory system may include: a nonvolatile memory device; a write buffer suitable for temporarily storing plural pieces of write data inputted from a host; and a controller suitable for, when, among the write data, first write data which are grouped into a transaction and second write data which are not grouped into a transaction are inputted to the write buffer, receiving total size information of a transaction for completion of commit of the first write data corresponding to the transaction, from the host. The controller may further: check, at a time of performing an actual flush operation for the write buffer, whether or not the commit of the first write data is completed; check, in the case where it is determined that commit-uncompleted first write data are included in the write buffer, a size of a space left in the write buffer by simulating a flush operation with the commit-uncompleted first write data excluded from the simulated flush operation; compare a checked size of the space left in the write buffer and the total size information; and determine whether to include the commit-uncompleted first write data in the actual flush operation depending on a comparison result.

The controller may further check, in the case where it is determined that the commit-uncompleted first write data are included in the write buffer, a buffer time for which the commit-uncompleted first write data have been stored in the write buffer, and the controller may include, in the case where it is determined that the buffered time is greater than or equal to a threshold time, the commit-uncompleted first write data in the flush operation.

The controller may receive a plurality of write commands respectively corresponding to the plural pieces of write data, from the host, transaction information of a corresponding piece of the write data may be included in each of the write commands, transaction identification (ID) information, commit information and abort information of the corresponding piece of the write data may be included in the transaction information, and the total size information may be additionally included in a write command corresponding to a first piece of the first write data.

The controller may classify, by checking the transaction ID information, write data of which transaction ID information are set to a specific value, as the first write data, and may classify write data of which transaction ID information are not set, as the second write data.

When first write data which are defined as first transaction data and of which transaction ID information are set to a first value are inputted to the write buffer from the host, the controller may receive first total size information for completion of commit of the first transaction data, from the host, when first write data which are defined as second transaction data and of which transaction ID information are set to a second value are inputted to the write buffer from the host, the controller may receive second total size information required for completion of commit of the second transaction data, from the host, and the controller may perform the actual flush operation when the write buffer is full of the write data.

In the case where it is determined that, at the time of performing the actual flush operation, commit information and abort information are not included in the transaction information of the respective first and second transaction data and it may be determined that the respective first and second transaction data have been stored in the write buffer for a time shorter than the designated threshold time, the controller may further: obtain a first calculated space by summing sizes of the first transaction data and the second transaction data left in the write buffer and a size of an empty space, as a result of simulating the flush operation with the first and second transaction data and not-flushed-in-simulation second write data excluded from the simulated flush operation, obtain a second calculated space by summing the size of the first transaction data left in the write buffer and the size of the empty space, as a result of simulating of the flush operation with the first transaction data and the not-flushed-in-simulation second write data excluded from the simulated flush operation; and obtain a third calculated space by summing the size of the second transaction data left in the write buffer and the size of the empty space, as a result of simulating the flush operation with the second transaction data and the not-flushed-in-simulation second write data excluded from the simulated flush operation, and the not-flushed-in-simulation second write data may be to be excluded from the actual flush operation among the second write data stored in the write buffer.

When the first calculated space is equal to or larger than the total size of the incomplete transactions obtained by summing the first total size information and the second total size information, the controller may perform the actual flush operation with the first and second transaction data and the not-flushed-in-simulation second write data excluded from the actual flush operation.

In the case where the first calculated space is smaller than the total size of the incomplete transactions, the controller may perform: the actual flush operation with any one transaction data of the first transaction data and the second transaction data and the not-flushed-in-simulation second write data excluded from the actual flush operation, in the case where the second calculated space is equal to or larger than the first total size information and the third calculated space is equal to or larger than the second total size information; the actual flush operation with the first transaction data and the not-flushed-in-simulation second write data excluded from the actual flush operation, in the case where the second calculated space is equal to or larger than the first total size information and the third calculated space is smaller than the second total size information; the actual flush operation with the second transaction data and the not-flushed-in-simulation second write data excluded from the actual flush operation, in the case where the second calculated space is smaller than the first total size information and the third calculated space is equal to or larger than the second total size information; and the actual flush operation with the not-flushed-in-simulation second write data excluded from the actual flush operation, in the case where the second calculated space is smaller than the first total size information and the third calculated space is smaller than the second total size information.

In the case where it is determined that, at the time of performing the actual flush operation, commit information and abort information are not included in the transaction information of the respective first transaction data and commit information is included in the transaction information of the respective second transaction data and it may be determined that the first transaction data have been stored in the write buffer for a time shorter than the designated threshold time, the controller may further: calculate a fourth calculated space by summing a size of the first transaction data left in the write buffer and the size of an empty space, as a result of simulating the flush operation with the first transaction data and not-flushed-in-simulation second write data excluded from the simulated flush operation; may perform the actual flush operation with the first transaction data and the not-flushed-in-simulation second write data excluded from the actual flush operation, in the case where the fourth calculated space is equal to or larger than the first total size information; and perform the actual flush operation with the not-flushed-in-simulation second write data excluded from the actual flush operation, in the case where the fourth calculated space is smaller than the first total size information. The not-flushed-in-simulation second write data may be to be excluded from the actual flush operation among the second write data stored in the write buffer.

In the case where it is determined that, at the time of performing the flush operation, commit information and abort information are not included in the transaction information of the respective first transaction data and abort information is included in the transaction information of the respective second transaction data and it may be determined that the first transaction data have been stored in the write buffer for a time shorter than the designated threshold time, the controller may further: obtain a fifth calculated space by summing a size of the first transaction data left in the write buffer, a size of the second transaction data which are in an aborted state and the size of an empty space, as a result of simulating the flush operation with the first and second transaction data and not-flushed-in-simulation second write data excluded from the simulated flush operation; perform the actual flush operation with the first and second transaction data and the not-flushed-in-simulation second write data excluded from the actual flush operation, in the case where the fifth calculated space is equal to or larger than the first total size information; and perform the actual flush operation with the second transaction data and the not-flushed-in-simulation second write data excluded from the actual flush operation, in the case where the fifth calculated space is smaller than the first total size information. The not-flushed-in-simulation second write data may be to be excluded from the actual flush operation among the second write data stored in the write buffer.

In an embodiment, a method for operating a memory system including a nonvolatile memory device and a write buffer for temporarily storing a write data inputted from a host, the method may include: a first receiving operation of receiving, when first write data, among the write data, which are grouped into a transaction and second write data which are not grouped into a transaction are inputted to the write buffer, total size information of a transaction for completion of commit of the first write data corresponding to the transaction, from the host; a first checking operation of checking, at a time of performing an actual flush operation for the write buffer, whether or not the commit of the first write data is completed; a second checking operation of checking, in the case where it is determined at the first checking operation that incomplete first write data are included in the write buffer, a size of a space left in the write buffer by simulating a flush operation with the commit-uncompleted first write data excluded from the simulated flush operation; comparing a checked size of the space left in the write buffer and the total size information; and determining whether to include the commit-uncompleted first write data in the actual flush operation depending on a comparison result.

The method may further include: a third checking operation of checking, in the case where it is determined at the first checking operation that the incomplete first write data are included in the write buffer, a buffer time for which the commit-uncompleted first write data have been stored in the write buffer; including performing the third checking operation when it is determined that the buffered time is greater than or equal to a designated threshold time, the commit-uncompleted first write data in the flush operation.

The method may further include: a second receiving operation of receiving a plurality of write commands respectively corresponding to the plural pieces of write data, from the host. Transaction information of a corresponding piece of the write data may be included in each of the write commands, transaction identification (ID) information, commit information and abort information of the corresponding piece of the write data may be included in the transaction information, and the total size information may be additionally included in a write command corresponding to a first piece among the first write data.

The method may further include: a first classifying operation of classifying, by checking transaction ID information, write data of which transaction ID information are set to a specific value, into the first write data; and a second classifying operation of classifying, by checking transaction ID information, write data of which transaction ID information are not set, into the second write data.

The method may further include performing the actual flush operation when the write buffer is full of the write data. The first receiving operation may include: receiving, when first write data which are defined as first transaction data and of which transaction ID information are set to a first value are inputted to the write buffer from the host, first total size information required for completion of commit of the first transaction data, from the host, receiving, when first write data which are defined as second transaction data and of which transaction ID information are set to a second value are inputted to the write buffer from the host, second total size information required for completion of commit of the second transaction data, from the host.

When it is determined that, at the time of performing the actual flush operation, commit information and abort information are not included in the transaction information of the respective first and second transaction data and it may be determined that the respective first and second transaction data have been buffered in the write buffer for a time shorter than the designated threshold time, the second checking act may include: obtaining a first calculated space by summing sizes of the first transaction data and the second transaction data left in the write buffer and a size of an empty space, as a result of simulating the flush operation with the first and second transaction data and not-flushed-in-simulation second write data excluded from the simulated flush operation, obtaining a second calculated space by summing the size of the first transaction data left in the write buffer and the size of the empty space, as a result of simulating of the flush operation with the first transaction data and the not-flushed-in-simulation second write data excluded from the simulated flush operation; and obtaining a third calculated space by summing the size of the second transaction data left in the write buffer and the size of the empty space, as a result of simulating the flush operation with the second transaction data and the not-flushed-in-simulation second write data excluded from the simulated flush operation. The not-flushed-in-simulation second write data may be to be excluded from the actual flush operation among the second write data stored in the write buffer.

The actual flush operation may be performed with the first and second transaction data and the not-flushed-in-simulation second write data excluded from the actual flush operation when the first calculated space is equal to or larger than the total size of the incomplete transactions obtained by summing the first total size information and the second total size information.

When the first calculated space is smaller than the total size of the incomplete transactions, the flush performing act may include performing: the actual flush operation with any one transaction data of the first transaction data and the second transaction data and the not-flushed-in-simulation second write data excluded from the actual flush operation, when the second calculated space is equal to or larger than the first total size information and the third calculated space is equal to or larger than the second total size information; the actual flush operation with the first transaction data and the not-flushed-in-simulation second write data excluded from the actual flush operation, when the second calculated space is equal to or larger than the first total size information and the third calculated space is smaller than the second total size information; the actual flush operation with the second transaction data and the not-flushed-in-simulation second write data excluded from the actual flush operation, when the second calculated space is smaller than the first total size information and the third calculated space is equal to or larger than the second total size information; and the actual flush operation with the not-flushed-in-simulation second write data excluded from the actual flush operation, when the second calculated space is smaller than the first total size information and the third calculated space is smaller than the second total size information.

The second checking operation may further include, when it is determined that, at the time of performing the actual flush operation, commit information and abort information are not included in the transaction information of the respective first transaction data and commit information is included in the transaction information of the respective second transaction data and it is determined that the first transaction data have been stored in the write buffer for a time shorter than the designated threshold time, calculating a fourth calculated space by summing a size of the first transaction data left in the write buffer and the size of an empty space, as a result of simulating the flush operation with the first transaction data and not-flushed-in-simulation second write data excluded from the simulated flush operation. The flush performing act may further include performing: the actual flush operation with the first transaction data and the not-flushed-in-simulation second write data excluded from the actual flush operation, when the fourth calculated space is equal to or larger than the first total size information; and the actual flush operation with the not-flushed-in-simulation second write data excluded from the actual flush operation, when the fourth calculated space is smaller than the first total size information. The not-flushed-in-simulation second write data may be to be excluded from the actual flush operation among the second write data stored in the write buffer.

The second checking operation may further include, when it is determined that, at the time of performing the flush operation, commit information and abort information are not included in the transaction information of the respective first transaction data and abort information is included in the transaction information of the respective second transaction data and it is determined that the first transaction data have been stored in the write buffer for a time shorter than the designated threshold time, obtaining a fifth calculated space by summing a size of the first transaction data left in the write buffer, a size of the second transaction data which are in an aborted state and the size of an empty space, as a result of simulating the flush operation with the first and second transaction data and not-flushed-in-simulation second write data excluded from the simulated flush operation. The flushing may further include performing: the actual flush operation with the first and second transaction data and the not-flushed-in-simulation second write data excluded from the actual flush operation, when the fifth calculated space is equal to or larger than the first total size information; and the actual flush operation with the second transaction data and the not-flushed-in-simulation second write data excluded from the actual flush operation, when the fifth calculated space is smaller than the first total size information. The not-flushed-in-simulation second write data may be to be excluded from the actual flush operation among the second write data stored in the write buffer.

In an embodiment, a memory system may include: a memory device; a write buffer suitable for buffering write data to be flushed to the memory device; and a controller suitable for storing transaction data, corresponding to a transaction that is not yet completed, buffered in the write buffer while flushing the write data when it is determined that all transaction data of the transaction is capable of being buffered in the write buffer after the flushing of the write data, the controller may determine whether all transaction data of the transaction is capable of being buffered in the write buffer after the flushing of the write data by simulating the flushing of the write data.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
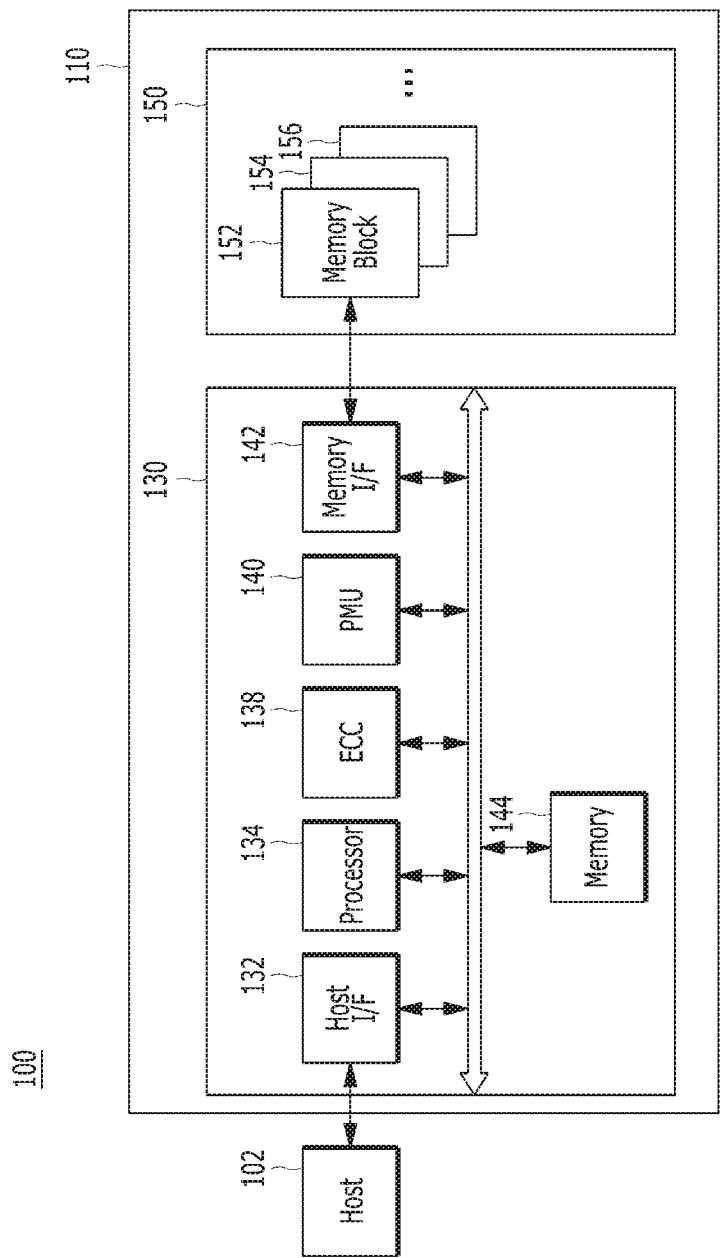
FIG. 1 is a block diagram illustrating a data processing system including a memory system in accordance with an embodiment of the present invention.

Various embodiments of the present invention are described below in more detail with reference to the accompanying drawings. The present invention, however, may be embodied in different other embodiments, forms and variations thereof and thus should not be construed as being limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless the context indicates otherwise.

The terminology used herein is for the purpose of describing particular embodiments only and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and/or micro-SD card.

The memory system 110 may be embodied by various types of storage devices. Non-limiting examples of storage devices included in the memory system 110 include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in any of the various types of memory systems exemplified above.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a NAND flash controller (NFC) 142 and a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC component 138 may not correct the error bits, and instead may output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the error correction techniques are not limited thereto. As such, the ECC components 138 may include any and all circuits, modules, systems or devices for suitable error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 exemplifies the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
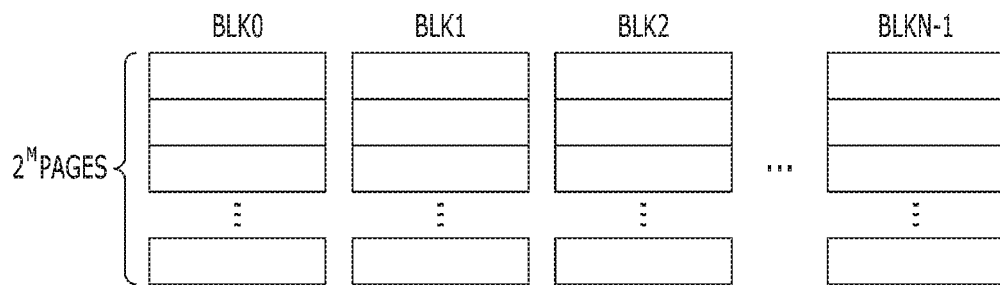
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks BLK0 to BLKN-1, and each of these blocks may include a plurality of pages, for example, $2^M$ pages, the number of which may vary according to circuit design. Memory cells included in the respective memory blocks 0 to N-1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
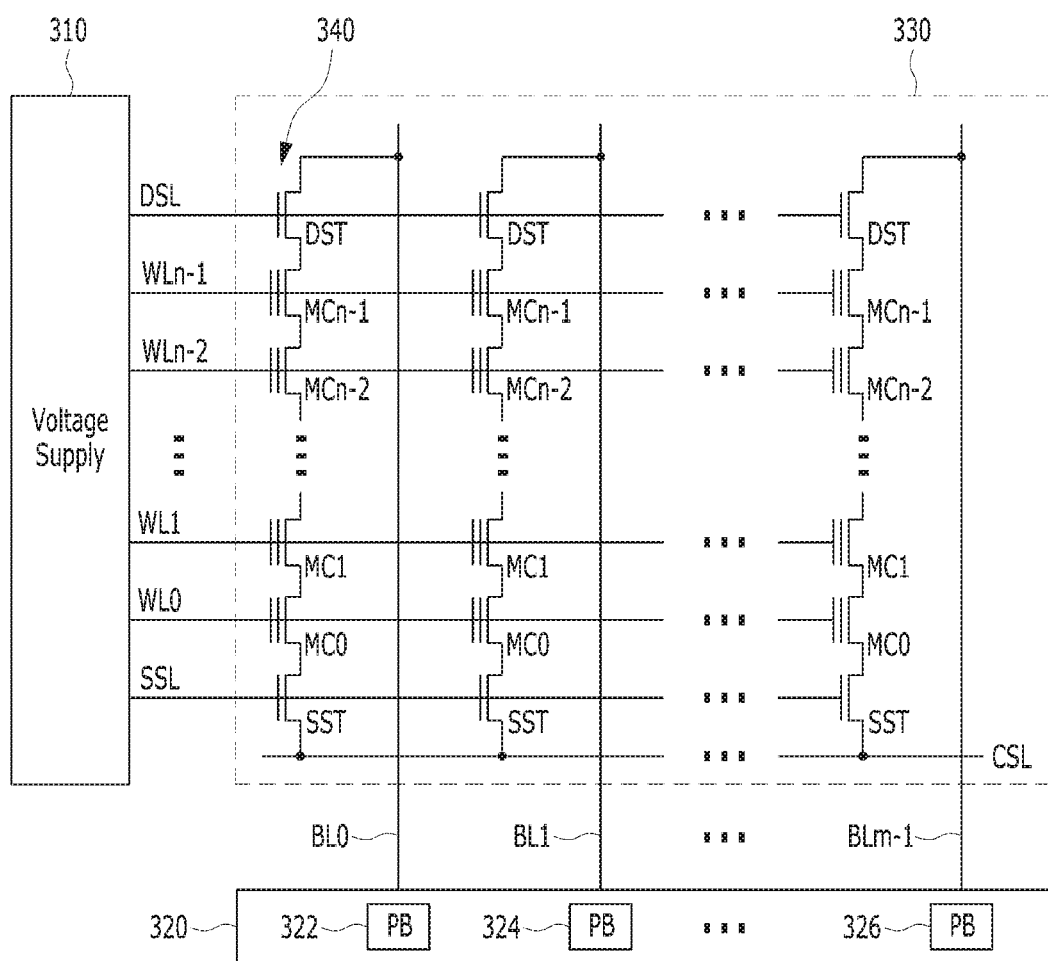
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330, which may correspond to any of the plurality of memory blocks 152 to 156, may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
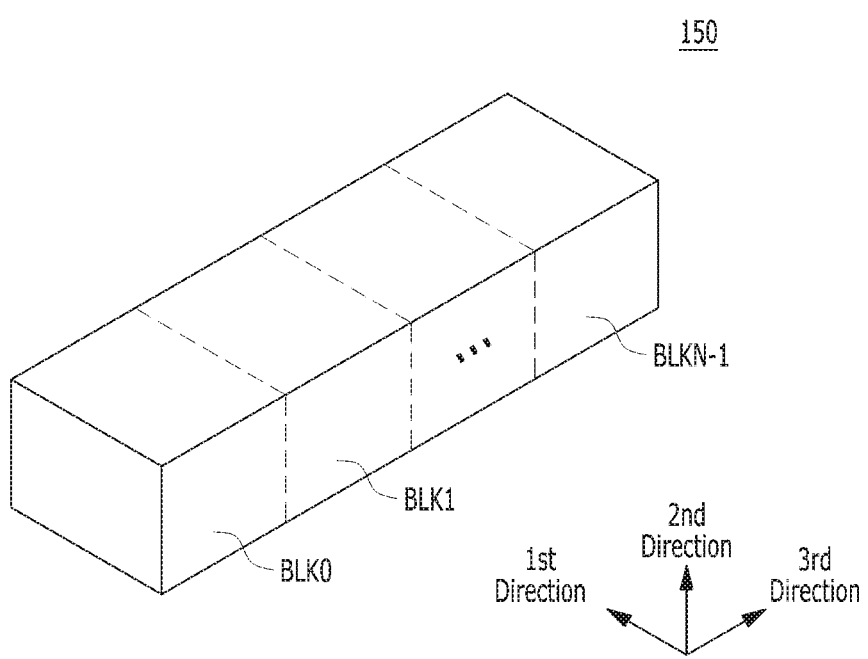
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

FIGS. 5A and 5B, FIGS. 6A to 6F, FIGS. 7A and 7B and FIGS. 8A and 8B are block diagrams to assist in the explanation of an operation of storing a plurality of write data grouped into a transaction, in a nonvolatile memory device, in a memory system in accordance with an embodiment of the present disclosure.

Figure 5A:
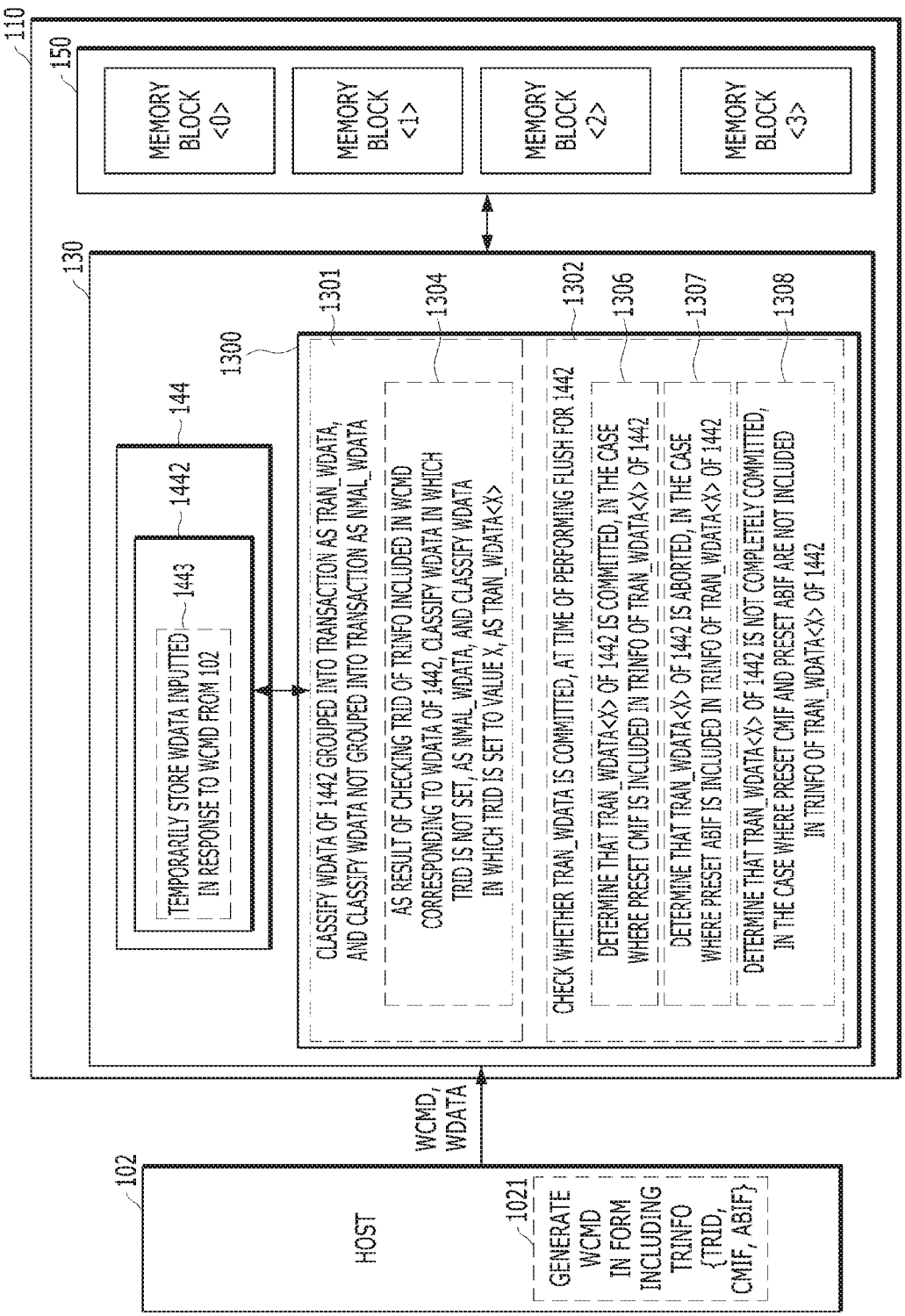
FIGS. 5A and 5B, FIGS. 6A to 6F, FIGS. 7A and 7B and FIGS. 8A and 8B are block diagrams illustrating an operation of storing a plurality of write data grouped into a transaction, in a nonvolatile memory device, in a memory system in accordance with an embodiment of the present disclosure.
Figure 5B:
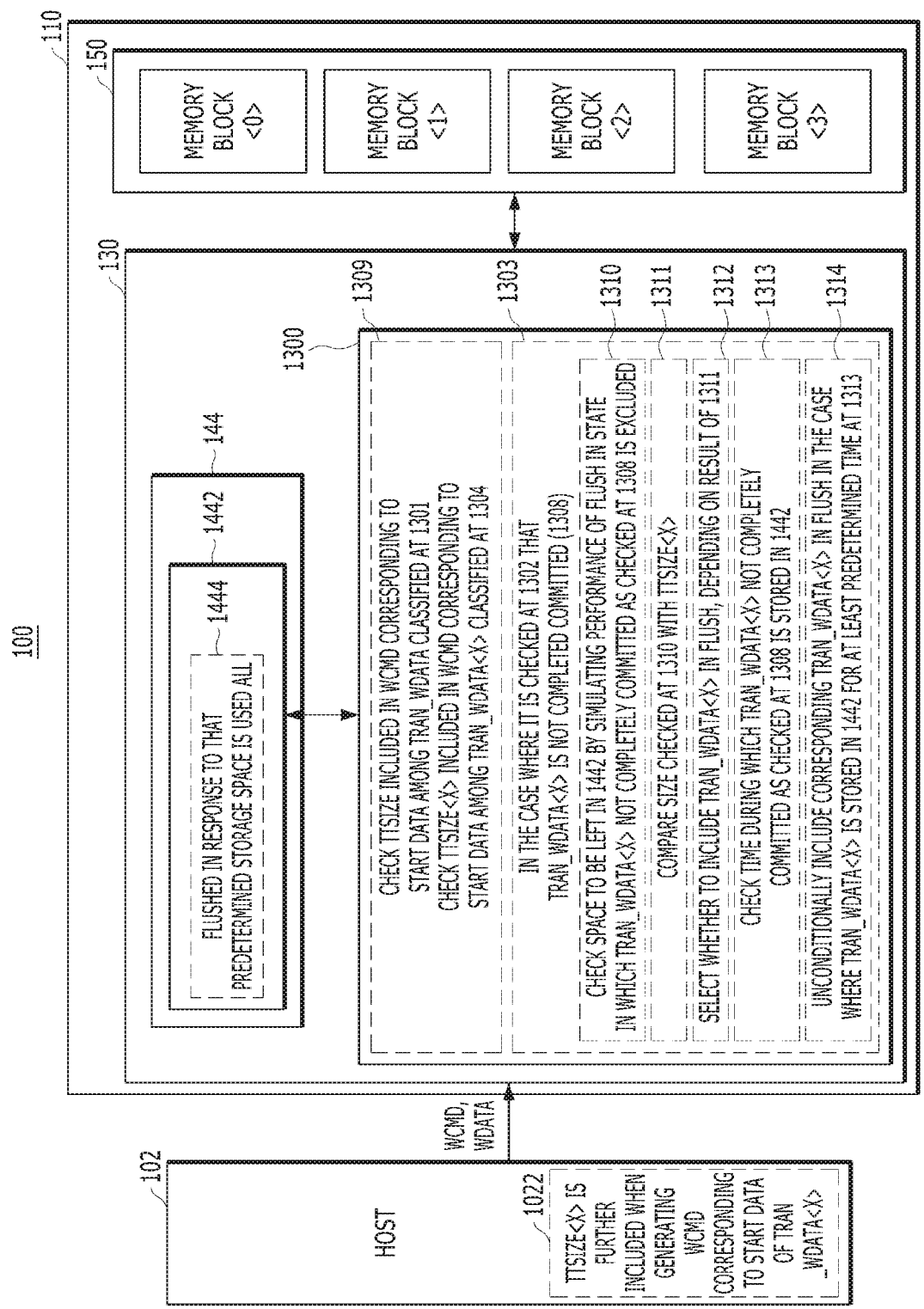

First, referring to FIGS. 5A and 5B, it may be seen that, by referring to the configuration of the data processing system 100 shown in FIG. 1, there is illustrated a configuration of the data processing system 100 including the host 102 and the memory system 110.

As described above with reference to FIG. 1, the memory system 110 includes the controller 130 and the memory device 150. The memory device 150 includes a plurality of memory blocks BLOCK<0:3> as described above with reference to FIG. 1.

While a configuration in which only one nonvolatile memory device 150 is included in the memory system 110 is disclosed in FIGS. 5A and 5B, this is merely an example; multiple nonvolatile memory devices may be included in the memory system 110. Also, the depiction in FIGS. 5A and 5B of a configuration in which four memory blocks BLOCK<0:3> are included in the nonvolatile memory device 150 is also just an example; more or less than four memory blocks may be included in the nonvolatile memory device 150. While not directly shown in FIGS. 5A and 5B, as described above with reference to FIG. 2, a plurality of pages, for example, $2^M$ number of pages, may be included in each of the memory blocks BLOCK<0:3>.

A host interface 132, a processor 134, an ECC unit 138, a power management unit 140 and a NAND flash controller 142, which are illustrated in FIG. 1 as being included in a controller 130, are not included in the controller 130 shown in FIGS. 5A and 5B. However, these components are omitted from the drawing for clarity; such components may be included in the controller 130.

The memory system 110 to be described hereunder performs an operation of processing write data WDATA which are grouped into a transaction.

The fact that write data WDATA are grouped into a transaction means that a plurality of write data WDATA used for the same purpose among the write data WDATA are grouped as a single transaction.

For example, in a database, data used for various purposes such as the correction, addition and update of already stored data may be grouped into transactions according to the respective purposes. In this regard, data for the purpose of correcting a database may be set to be grouped into one transaction, and data for the purpose of adding a database may be set to be grouped into another transaction.

Therefore, when write data WDATA grouped into one transaction are transmitted from the host 102 to the memory system 110, there exist a commit state in which all the write data WDATA are normally transmitted and stored and are thus valid and an abort state in which even any one write data WDATA is not normally transmitted or stored or in which all the write data WDATA are invalidated according to an abort request of the host 102. That is to say, write data WDATA which are grouped into one transaction is valid only when they are in a commit state. indicating all of them are normally transmitted and stored.

For example, in order for first write data TRAN_WDATA grouped into a transaction, among the write data WDATA transmitted from the host 102 to the memory system 110, to be determined as in a commit state, all of the first write data TRAN_WDATA should be normally transmitted from the host 102 to the memory system 110 and be completely stored in the memory system 110, and at the same time, there should be no abort request from the host 102. If even any piece of the first write data TRAN_WDATA is not normally transmitted and stored or an abort request is received from the host 102, all of the first write data TRAN_WDATA are determined as in an abort state.

For reference, the operation of managing the first write data TRAN_WDATA grouped into a transaction by classifying them into a commit state or an abort state as described above may be generally referred to as an operation for securing the atomicity of the transaction, as is known in the field of database systems.

In detail, referring to FIGS. 5A and 5B, the memory system 110 includes the controller 130 and the nonvolatile memory device 150, and the controller 130 includes the volatile memory device 144 and a transaction management circuit 1300.

The nonvolatile memory device 150 includes the plurality of memory blocks BLOCK<0:3>.

The volatile memory device 144 includes a write buffer 1442. The write buffer 1442 temporarily stores plural pieces of write data WDATA provided from the host 102 at operation 1443.

The controller 130 performs a flush operation of flushing data buffered in the write buffer 1442 into the nonvolatile memory device 150 at operation 1444 when the write buffer 1442 is full of data.

The transaction management circuit 1300 classifies the write data WDATA stored in the write buffer 1442 but not yet flushed, into first write data TRAN_WDATA which are grouped into a transaction and second write data NMAL_WDATA which are not grouped into a transaction at operation 1301.

The write data WDATA are sequentially stored in the write buffer 1442 according to a sequence of input thereto. Therefore, each piece of the first write data TRAN_WDATA and the second write data NMAL_WDATA may be buffered in a distributed manner in the write buffer 1442.

Therefore, the transaction management circuit 1300 classifies respective pieces of the write data WDATA into the first write data TRAN_WDATA and the second write data NMAL_WDATA depending on whether the respective pieces of the write data WDATA are grouped into a transaction or not.

The operation 1301 will be described in detail hereunder.

First, when pieces of write data WDATA are inputted from the host 102, write commands WCMD respectively corresponding to the pieces of write data WDATA are inputted together.

In each of the write commands WCMD, transaction information TRINFO for a corresponding piece of write data WDATA is included.

Also, in the transaction information TRINFO for the write data WDATA, a transaction identification (ID) information TRID, a transaction commit information CMIF and a transaction abort information ABIF are included.

The transaction information TRINFO including the transaction ID information TRID, the transaction commit information CMIF and the transaction abort information ABIF are generated in the host 102 at operation 1021, and are inputted to the controller 130 through the write command WCMD together with the write data WDATA.

Accordingly, the controller 130 of the memory system 110 stores the write data WDATA in the write buffer 1442 in response to the write commands WCMD. In succession, the controller 130 flushes the write data WDATA from the write buffer 1442 into the nonvolatile memory device 150 when the write buffer 1442 is full of the write data WDATA.

The transaction management circuit 1300 classifies the write data WDATA into the first write data TRAN_WDATA and the second write data NMAL_WDATA by checking transaction ID information TRID included in the write commands WCMD at operation 1304.

In other words, the transaction management circuit 1300 classifies write data WDATA, transaction ID information TRID corresponding to which is set to have a specified value x, into first write data TRAN_WDATA<x>.

Also, the transaction management circuit 1300 classifies write data WDATA, transaction ID information TRID corresponding to which is not set, into second write data NMAL_WDATA.

For example, write data WDATA, the transaction ID information TRID corresponding to which has a first value, may be first write data TRAN_WDATA1 which are grouped into a first transaction.

Similarly, write data WDATA, the transaction ID information TRID corresponding to which has a second value, may be first write data TRAN_WDATA2 which are grouped into a second transaction.

Conversely, write data WDATA, the transaction ID information TRID corresponding to which is not set to have any value, may be second write data NMAL_WDATA which are not grouped into a transaction.

For reference, the fact that transaction ID information TRID are not set to any value may mean the case where they are set to a predefined initial value or a value that is meaningless as a transaction ID information.

In a write command WCMD corresponding the first write data TRAN_WDATA, which is starting data within a corresponding transaction, there is included a total size information TTSIZE representing data size of the corresponding transaction. Namely, when the first write data TRAN_WDATA grouped into a transaction and the write commands WCMD corresponding thereto are generated in the host 102, the total size information TTSIZE is further included in a write command WCMD corresponding to the first write data TRAN_WDATA, which is starting data within the transaction, at operation 1022.

Thus, when receiving and storing the first write data TRAN_WDATA in the write buffer 1442, the controller 130 receives the total size information TTSIZE.

For example, when first write data TRAN_WDATA are grouped into a first transaction, the controller 130 receives, from the host 102, a first total size information TTSIZE1 representing the data size of the first transaction.

Similarly, when first write data TRAN_WDATA are grouped into a second transaction, the controller 130 receives, from the host 102, a second total size information TTSIZE2 representing the data size of the second transaction.

When classifying, at the operation 1301, the first write data TRAN_WDATA among the write data WDATA stored in the write buffer 1442, the transaction management circuit 1300 checks a total size information TTSIZE included in a write command WCMD corresponding to first write data TRAN_WDATA, which is starting data within a corresponding transaction at operation 1309.

For example, when classifying, at the operation 1304, the first write data TRAN_WDATA1 among the write data WDATA, the transaction management circuit 1300 checks a first total size information TTSIZE1 included in a write command WCMD corresponding to the first write data TRAN_WDATA, which is first stored in the write buffer 1442 among the plural pieces of first write data TRAN_WDATA1 grouped into the first transaction.

Similarly, when classifying, at the operation 1304, the first write data TRAN_WDATA2 among the write data WDATA, the transaction management circuit 1300 checks a second total size information TTSIZE2 included in a write command WCMD corresponding to the first write data TRAN_WDATA, which is first stored in the write buffer 1442 among the first write data TRAN_WDATA2 grouped into the second transaction.

The transaction management circuit 1300 checks, at a time of performing a flush operation, whether a transaction of the first write data TRAN_WDATA is committed (i.e., completed) or not at operation 1302.

Due to the characteristics of first write data TRAN_WDATA grouped into a transaction, a scheme of flushing the first write data TRAN_WDATA should be changed depending on whether the transaction is committed or not.

Therefore, the transaction management circuit 1300 first checks, at a time performing a flush operation, whether the first write data TRAN_WDATA are committed or not at the operation 1302.

For example, in the case where set commit information CMIF is included among the transaction information TRINFO of the respective first write data TRAN_WDATA1 grouped into the first transaction as a result of checking at the operation 1302, the first transaction may be regarded as committed or completed at operation 1306.

In the case where the set commit information CMIF is not included among the transaction information TRINFO of the respective first write data TRAN_WDATA2 grouped into the second transaction as a result of checking at the operation 1302, the second transaction may be regarded as not committed or as not completed at operation 1308.

In the case where set abort information ABIF is included among the transaction information TRINFO of respective first write data TRAN_WDATA3 grouped into a third transaction as a result of checking at the operation 1302, third transaction may be regarded as aborted at operation 1307.

For reference, the transaction ID information TRID corresponding to the first write data TRAN_WDATA1 grouped into the first transaction may have the first value. The transaction ID information TRID corresponding to the first write data TRAN_WDATA2 grouped into the second transaction may have the second value. The transaction ID information TRID corresponding to the first write data TRAN_WDATA3 grouped into the third transaction may have a third value.

In this way, the respective first write data TRAN_WDATA may be grouped into different transactions according to the value of the transaction ID information TRID.

That is to say, among a plurality of transactions, into which plural pieces of the first write data TRAN_WDATA are grouped, a certain transaction may be of a commit state (i.e., completed state), a certain transaction may be of an incomplete state, and a certain transaction may be of an aborted state.

In the case where the transaction is determined as not committed at operation 1308 as a result of checking at the operation 1302, the controller 130 performs a simulated flush operation of virtually flushing the first write data TRAN_WDATA other than the pieces of the first write data TRAN_WDATA corresponding to the incomplete transaction. In this case, the transaction management circuit 1300 checks potentially available space of the write buffer 1442 at operation 1310.

In other words, in the case where set commit information CMIF and set abort information ABIF are determined as not included in the transaction information TRINFO of the respective first write data TRAN_WDATA grouped into a transaction as a result of checking at the operation 1302 and thus the transaction is regarded as not committed or as not completed at operation 1308, the transaction management circuit 1300 checks potentially available space of the write buffer 1442, by simulating a flush operation of virtually flushing the first write data TRAN_WDATA other than the pieces of the first write data TRAN_WDATA corresponding to the incomplete transaction. The simulation of a flush operation may be mathematical calculation without actually performing the flush operation.

Potentially available space of the write buffer 1442 to be determined at the operation 1310 may correspond to sum of the size of the first write data TRAN_WDATA corresponding to the incomplete transaction and the size of the first write data TRAN_WDATA to be flushed through the actual flush operation.

In detail, while it is exemplified in the above description for the operation 1310 that only the first write data TRAN_WDATA corresponding to the incomplete transaction are excluded from the simulated flush operation, it is also possible to selectively and additionally exclude some of the second write data NMAL_WDATA from the simulated flush operation. When data is excluded from a flush operation, that data may not be flushed through that flush operation and instead may keep that data buffered in the write buffer 1442.

The operation of excluding some of the second write data NMAL_WDATA from the simulated flush operation may or may not be performed depending on design or the operating situation of the memory system 110.

For example, when the write data WDATA are flushed into the nonvolatile memory device 150 according to an interleaving scheme or when the size of the entire write data WDATA beyond the capacity of selected pages for a program operation, some second write data NMAL_WDATA may be excluded from the simulated flush operation.

Because of this fact, the potentially available space of the write buffer 1442 may be changed depending on design or the operating situation of the memory system 110.

Hence, the operation 1310 of the transaction management circuit 1300 may check potentially available space of the write buffer 1442 when performing the simulated flush operation in the case where a transaction is not committed and thus the first write data TRAN_WDATA corresponding to the incomplete transaction remain in the write buffer 1442 at operation 1308.

The potentially available space of the write buffer 1442 is compared with the total size information TTSIZE of the incomplete transaction at operation 1311.

When the first write data TRAN_WDATA are stored in the write buffer 1442, the total size information TTSIZE of the first write data TRAN_WDATA corresponding to the incomplete transaction is checked through the operation 1309.

Therefore, before an actual flush operation is performed, the potentially available space of the write buffer 1442 and the total size information TTSIZE for the incomplete transaction may be compared.

Depending on a result of the operation 1311, the transaction management circuit 1300 determine whether to flush the first write data TRAN_WDATA corresponding to the incomplete transaction during an actual flush operation at operation 1312.

When the potentially available space of the write buffer 1442 is larger than the total size information TTSIZE of the first write data TRAN_WDATA corresponding to the incomplete transaction, the transaction management circuit 1300 performs the actual flush operation of actually flushing the first write data TRAN_WDATA other than the pieces of the first write data TRAN_WDATA corresponding to the incomplete transaction, through the operation 1312. Thus, even after the actual flush operation, the first write data TRAN_WDATA corresponding to the incomplete transaction may be continuously stored in the write buffer 1442.

Conversely, in the case where the potentially available space of the write buffer 1442 is smaller than the total size information TTSIZE of the first write data TRAN_WDATA corresponding to the incomplete transaction, the transaction management circuit 1300 performs the actual flush operation of actually flushing the first write data TRAN_WDATA as well as the pieces of the first write data TRAN_WDATA corresponding to the incomplete transaction, through the operation 1312. Therefore, when the actual flush operation is actually performed, the first write data TRAN_WDATA corresponding to the incomplete transaction may be discarded from the write buffer 1442 after they are flushed into the nonvolatile memory device 150.

In the case where the transaction is determined as not committed at operation 1308 as a result of checking at the operation 1302, the transaction management circuit 1300 checks a time for which the first write data TRAN_WDATA corresponding to the incomplete transaction have been kept buffered in the write buffer 1442 at operation 1313, separately from performing the above-described operation 1309, operation 1310, operation 1311 and operation 1312.

In other words, when the transaction is determined as not committed at operation 1308 as a result of checking at the operation 1302, the transaction management circuit 1300 performs the operation 1313 of checking a time for which the first write data TRAN_WDATA corresponding to the incomplete transaction have been stored in the write buffer 1442.

In the case where the time checked at the operation 1313 is equal to or longer than a designated threshold time, the transaction management circuit 1300 controls the actual flush operation of actually flushing the pieces of the first write data TRAN_WDATA corresponding to the incomplete transaction at operation 1314.

Namely, in the case where it is checked through the operation 1313 that the first write data TRAN_WDATA corresponding to the incomplete transaction have been stored for a sufficiently long time, which is equal to or longer than the designated threshold time, the first write data TRAN_WDATA corresponding to the incomplete transaction are flushed through the actual flush operation at operation 1314.

For reference, the above-described operation 1313 and operation 1314 may be performed on, before or after a time when the above-described operation 1309, operation 1310, operation 1311 and operation 1312 are performed.

In order to describe, through concrete examples, the above-described operation of storing the write data WDATA grouped into a transaction in the nonvolatile memory device 150 in accordance with embodiments of the present disclosure, reference may be made to FIGS. 6A to 6F, FIGS. 7A and 7B and FIGS. 8A and 8B.

In FIGS. 6A to 6F, FIGS. 7A and 7B and FIGS. 8A and 8B which will be explained below, descriptions will be made hereunder by defining plural pieces of the first write data TRAN_WDATA, the transaction ID information TRID corresponding to which have the first value (e.g., the plural pieces of the first write data TRAN_WDATA1 grouped into the first transaction) as first transaction data TRAN_WDATA1. Also, descriptions will be made hereunder by defining plural pieces of the first write data TRAN_WDATA, the transaction ID information TRID corresponding to which have the second value (e.g., the plural pieces of the first write data TRAN_WDATA2 grouped into the second transaction) as second transaction data TRAN_WDATA2. Moreover, descriptions will be made hereunder by defining some second write data NMAL_WDATA to be excluded from the simulated flush operation as not-flushed-in-simulation second write data. As described above, the not-flushed-in-simulation second write data may be selected in various ways.

Referring to FIGS. 6A to 6F, FIGS. 7A and 7B and FIGS. 8A and 8B, it is assumed that the write buffer 1442 can buffer total 10 pieces of the write data WDATA.

Figure 6A:
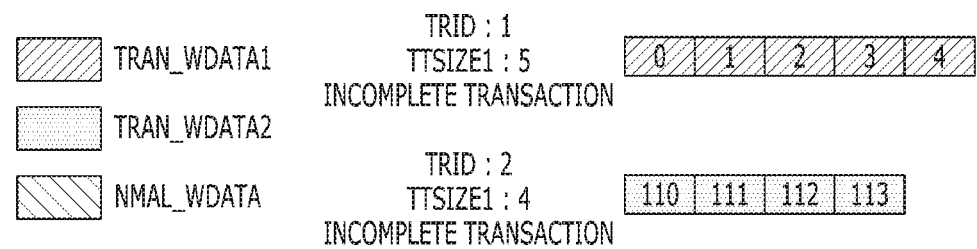
Figure 6A:
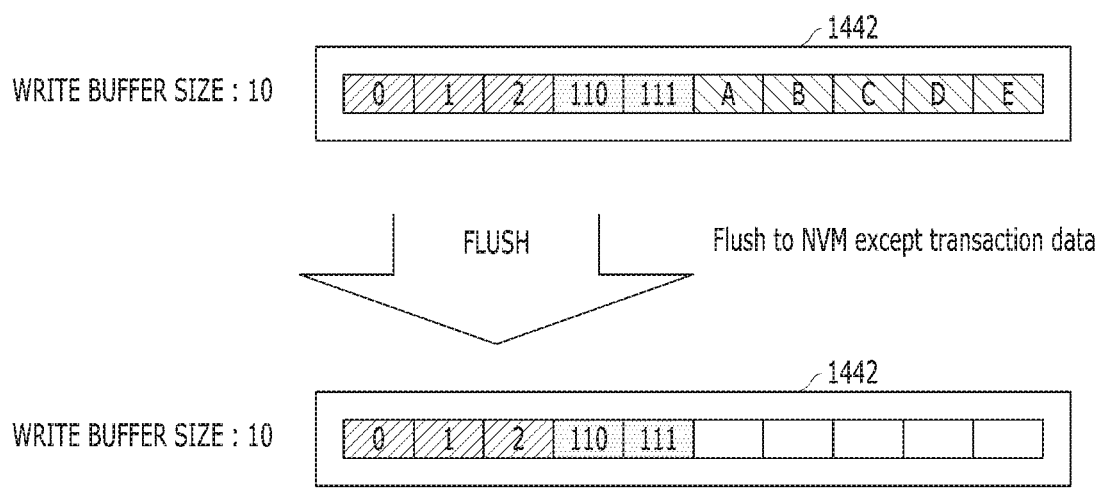

Referring to FIG. 6A, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442.

The transaction management circuit 1300 may detect that first total size information TTSIZE1 of the first transaction is 5 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 5, that is, the number of total pieces of the first transaction data TRAN_WDATA1 needed for the first transaction to be committed is 5 of 0, 1, 2, 3 and 4.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 4 and is not completed (INCOMPLETE TRANSACTION) and thus 110 and 111 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 4, that is, the number of total pieces of the second transaction data TRAN_WDATA2 needed for the second transaction to be committed is 4 of 110, 111, 112 and 113.

Also, by checking through the operation 1302 described above with reference to FIGS. 5A and 5B that set commit information CMIF and set abort information ABIF are not included in each of 110 and 111 as the second transaction data TRAN_WDATA2, the transaction management circuit 1300 may detect that 110 and 111 as the second transaction data TRAN_WDATA2 are of the incomplete second transaction.

It may be assumed that not-flushed-in-simulation second write data to be excluded from the simulated flush operation among the second write data NMAL_WDATA do not exist.

In this state, the transaction management circuit 1300 may obtain a first calculated space by summing the size of the first transaction data TRAN_WDATA1 left in the write buffer 1442, the size of the second transaction data TRAN_WDATA2 left in the write buffer 1442 and the size of an empty space to be left in the write buffer 1442 through the simulated flush operation with the first transaction data TRAN_WDATA1 and the second transaction data TRAN_WDATA2 excluded from the simulated flush operation.

Also, the transaction management circuit 1300 may obtain a second calculated space by summing the size of the first transaction data TRAN_WDATA1 left in the write buffer 1442 and the size of an empty space to be left in the write buffer 1442 through the simulated flush operation with the first transaction data TRAN_WDATA1 excluded from the simulated flush operation.

Further, the transaction management circuit 1300 may obtain a third calculated space by summing the size of the second transaction data TRAN_WDATA2 left in the write buffer 1442 and the size of an empty space to be left in the write buffer 1442 through the simulated flush operation with the second transaction data TRAN_WDATA2 excluded from the simulated flush operation.

For example, as a result of the simulated flush operation with 0, 1 and 2 as the first transaction data TRAN_WDATA1 and 110 and 111 as the second transaction data TRAN_WDATA2 excluded from the simulated flush operation, the size of an empty space to be left in the write buffer 1442 is 5. Therefore, the first calculated space is 10 by summing 3 as the size of the first transaction data TRAN_WDATA1, 2 as the size of the second transaction data TRAN_WDATA2 and 5 as the size of the empty space.

As a result of the simulated flush operation with 0, 1 and 2 as the first transaction data TRAN_WDATA1 excluded from the simulated flush operation, the size of an empty space to be left in the write buffer 1442 is 7. Therefore, the second calculated space is 10 by summing 3 as the size of the first transaction data TRAN_WDATA1 and 7 as the size of an empty space.

As a result of the simulated flush operation with 110 and 111 as the second transaction data TRAN_WDATA2 excluded from the simulated flush operation, the size of an empty space to be left in the write buffer 1442 is 8. Therefore, the third calculated space is 10 by summing 2 as the size of the second transaction data TRAN_WDATA2 and 8 as the size of an empty space.

In this way, it may be seen that, in the case where not-flushed-in-simulation second write data to be excluded from the simulated flush operation among the second write data NMAL_WDATA do not exist, the first calculated space, the second calculated space and the third calculated space are all the same.

Then, the transaction management circuit 1300 checks a total size of the incomplete transactions as 9 by summing 5 as the first total size information TTSIZE1 of the first transaction and 4 as the second total size information TTSIZE2 of the second transaction.

Then, the transaction management circuit 1300 compares the first calculated space and the total size of the incomplete transactions through the operation 1311. In other words, 10 as the value of the first calculated space and 9 as the total size of the incomplete transactions are compared.

As a result of the comparison, it may be seen that the first calculated space is larger than the total size of the incomplete transactions. The transaction management circuit 1300 determines to perform an actual flush operation with the first transaction data TRAN_WDATA1 and the second transaction data TRAN_WDATA2 excluded from the actual flush operation, through the operation 1312.

Therefore, as the actual flush operation is performed with the first transaction data TRAN_WDATA1 and the second transaction data TRAN_WDATA2 excluded from the actual flush operation, 0, 1 and 2 as the first transaction data TRAN_WDATA1 and 110 and 111 as the second transaction data TRAN_WDATA2 may be kept buffered in the write buffer 1442 even after the actual flush operation.

Of course, it may be seen that A, B, C, D and E as the second write data NMAL_WDATA are discarded as a result of the actual flush operation to result in an empty space.

Because the first calculated space selected as the first calculated space is larger than the total size of the incomplete transactions as a result of the comparison, the transaction management circuit 1300 does not perform a comparing operation any more for the second calculated space and the third calculated space.

Figure 6B:
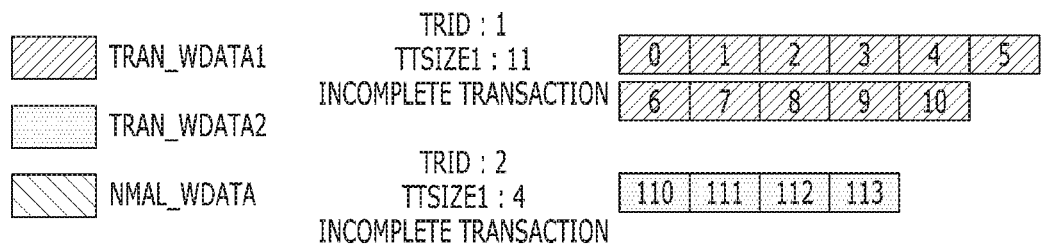
Figure 6B:
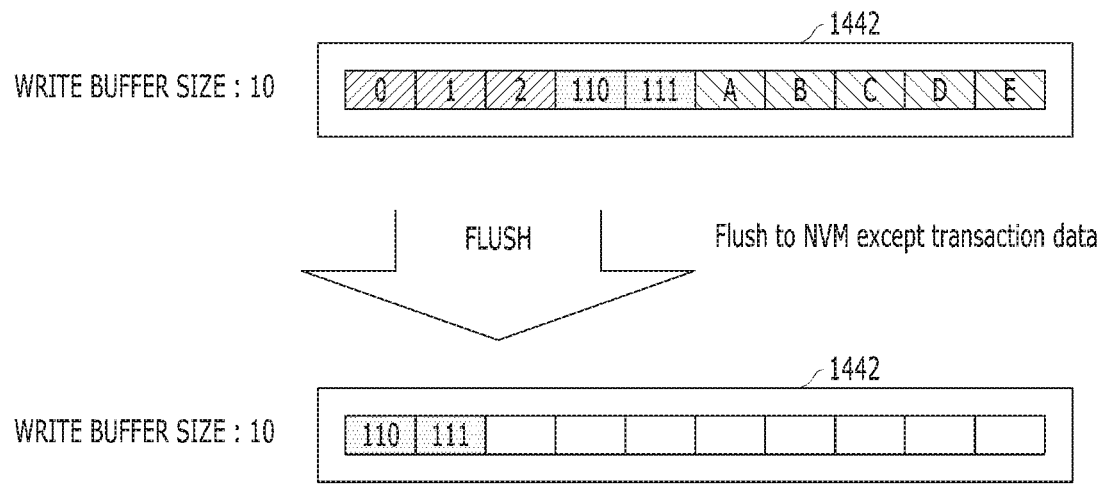

Referring to FIG. 6B, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442. Namely, it may be seen that the write data WDATA stored in the write buffer 1442 are the same as in the write buffer 1442 described above with reference to FIG. 6A.

The transaction management circuit 1300 may detect that first total size information TTSIZE1 of the first transaction is 11 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 11, that is, the number of total pieces of the first transaction data TRAN_WDATA1 needed for the first transaction to be committed is 11 of 0, 1, 2, 3, 4, 5, 6, 7, 8, 9 and 10.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 4 and is not completed (INCOMPLETE TRANSACTION) and thus 110 and 111 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 4, that is, the number of total pieces of the second transaction data TRAN_WDATA2 needed for the second transaction to be committed is 4 of 110, 111, 112 and 113.

Also, by checking through the operation 1302 described above with reference to FIGS. 5A and 5B that set commit information CMIF and set abort information ABIF are not included in each of 110 and 111 as the second transaction data TRAN_WDATA2, the transaction management circuit 1300 may detect that 110 and 111 as the second transaction data TRAN_WDATA2 are of the incomplete second transaction.

It may be assumed that not-flushed-in-simulation second write data to be excluded from the simulated flush operation among the second write data NMAL_WDATA do not exist.

Since the state of the write data WDATA is the same as in the write buffer 1442 described above with reference to FIG. 6A, it may be seen that a first calculated space, a second calculated space and a third calculated space are all the same as 10.

Then, the transaction management circuit 1300 checks a total size of the incomplete transactions as 15 by summing 11 as the first total size information TTSIZE1 of the first transaction and 4 as the second total size information TTSIZE2 of the second transaction.

Then, the transaction management circuit 1300 compares the first calculated space and the total size of the incomplete transactions through the operation 1311. In other words, 10 as the value of the first calculated space and 15 as the value of the total size of the incomplete transactions are compared.

As a result of the comparison, it may be seen that the first calculated space is smaller than the total size of the incomplete transactions. Accordingly, the transaction management circuit 1300 compares the second calculated space and the first total size information TTSIZE1, and compares the third calculated space and the second total size information TTSIZE2. In other words, the transaction management circuit 1300 compares 10 as the second calculated space and 11 as the first total size information TTSIZE1, and compares 10 as the third calculated space and 4 as the second total size information TTSIZE2.

As a result of the comparison, it may be seen that the second calculated space is smaller than the first total size information TTSIZE1 and the third calculated space is larger than the second total size information TTSIZE2. Accordingly, the transaction management circuit 1300 determines to perform an actual flush operation with the second transaction data TRAN_WDATA2 are excluded from the actual flush operation, through the operation 1312.

Therefore, as the actual flush operation is performed with the second transaction data TRAN_WDATA2 excluded from the actual flush operation, 110 and 111 as the second transaction data TRAN_WDATA2 may be kept buffered in the write buffer 1442 even after the actual flush operation.

Of course, it may be seen that 0, 1 and 2 as the first transaction data TRAN_WDATA1 and A, B, C, D and E as the second write data NMAL_WDATA are discarded as a result of the actual flush operation to result in an empty space.

Figure 6C:
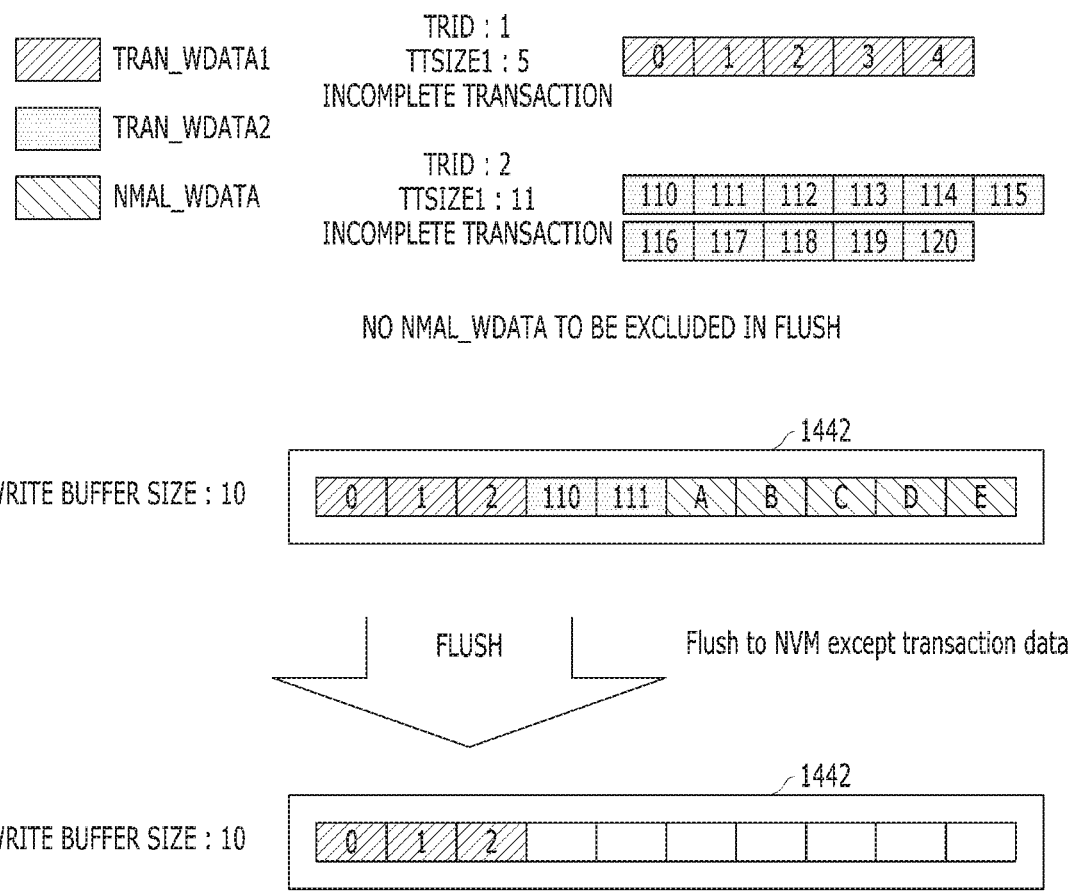

Referring to FIG. 6C, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442. Namely, it may be seen that the write data WDATA stored in the write buffer 1442 are the same as in the write buffer 1442 described above with reference to FIG. 6A.

The transaction management circuit 1300 may detect that first total size information TTSIZE1 of the first transaction is 5 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 5, that is, the number of total pieces of the first transaction data TRAN_WDATA1 needed for the first transaction to be committed is 5 of 0, 1, 2, 3 and 4.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 11 and is not completed (INCOMPLETE TRANSACTION) and thus 110 and 111 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 11, that is, the number of total pieces of the second transaction data TRAN_WDATA2 needed for the second transaction to be committed is 11 of 110, 111, 112, 113, 114, 115, 116, 117, 118, 119 and 120.

Also, by checking through the operation 1302 described above with reference to FIGS. 5A and 5B that set commit information CMIF and set abort information ABIF are not included in each of 110 and 111 as the second transaction data TRAN_WDATA2, the transaction management circuit 1300 may detect that 110 and 111 as the second transaction data TRAN_WDATA2 are of the incomplete second transaction.

It may be assumed that not-flushed-in-simulation second write data to be excluded from the simulated flush operation among the second write data NMAL_WDATA do not exist.

Since the state of the write data WDATA is the same as in the write buffer 1442 described above with reference to FIG. 6A, it may be seen that a first calculated space, a second calculated space and a third calculated space are all the same as 10.

Then, the transaction management circuit 1300 checks a total size of the incomplete transactions as 16 by summing 5 as the first total size information TTSIZE1 of the first transaction and 11 as the second total size information TTSIZE2 of the second transaction.

Then, the transaction management circuit 1300 compares the first calculated space and the total size of the incomplete transactions through the operation 1311. In other words, 10 as the value of the first calculated space and 16 as the value of the total size of the incomplete transactions are compared.

As a result of the comparison, it may be seen that the first calculated space is smaller than the total size of the incomplete transactions. Accordingly, the transaction management circuit 1300 compares the second calculated space and the first total size information TTSIZE1, and compares the third calculated space and the second total size information TTSIZE2. In other words, the transaction management circuit 1300 compares 10 as the second calculated space and 5 as the first total size information TTSIZE1, and compares 10 as the third calculated space and 11 as the second total size information TTSIZE2.

As a result of the comparison, it may be seen that the second calculated space is larger than the first total size information TTSIZE1 and the third calculated space is smaller than the second total size information TTSIZE2. Accordingly, the transaction management circuit 1300 determines to perform an actual flush operation with the first transaction data TRAN_WDATA1 are excluded from the actual flush operation, through the operation 1312.

Therefore, as the actual flush operation is performed with the first transaction data TRAN_WDATA1 excluded from the actual flush operation, 0, 1 and 2 as the first transaction data TRAN_WDATA1 may be kept buffered in the write buffer 1442 even after the actual flush operation.

Of course, it may be seen that 110 and 111 as the second transaction data TRAN_WDATA2 and A, B, C, D and E as the second write data NMAL_WDATA are discarded as a result of the actual flush operation to result in an empty space.

Figure 6D:
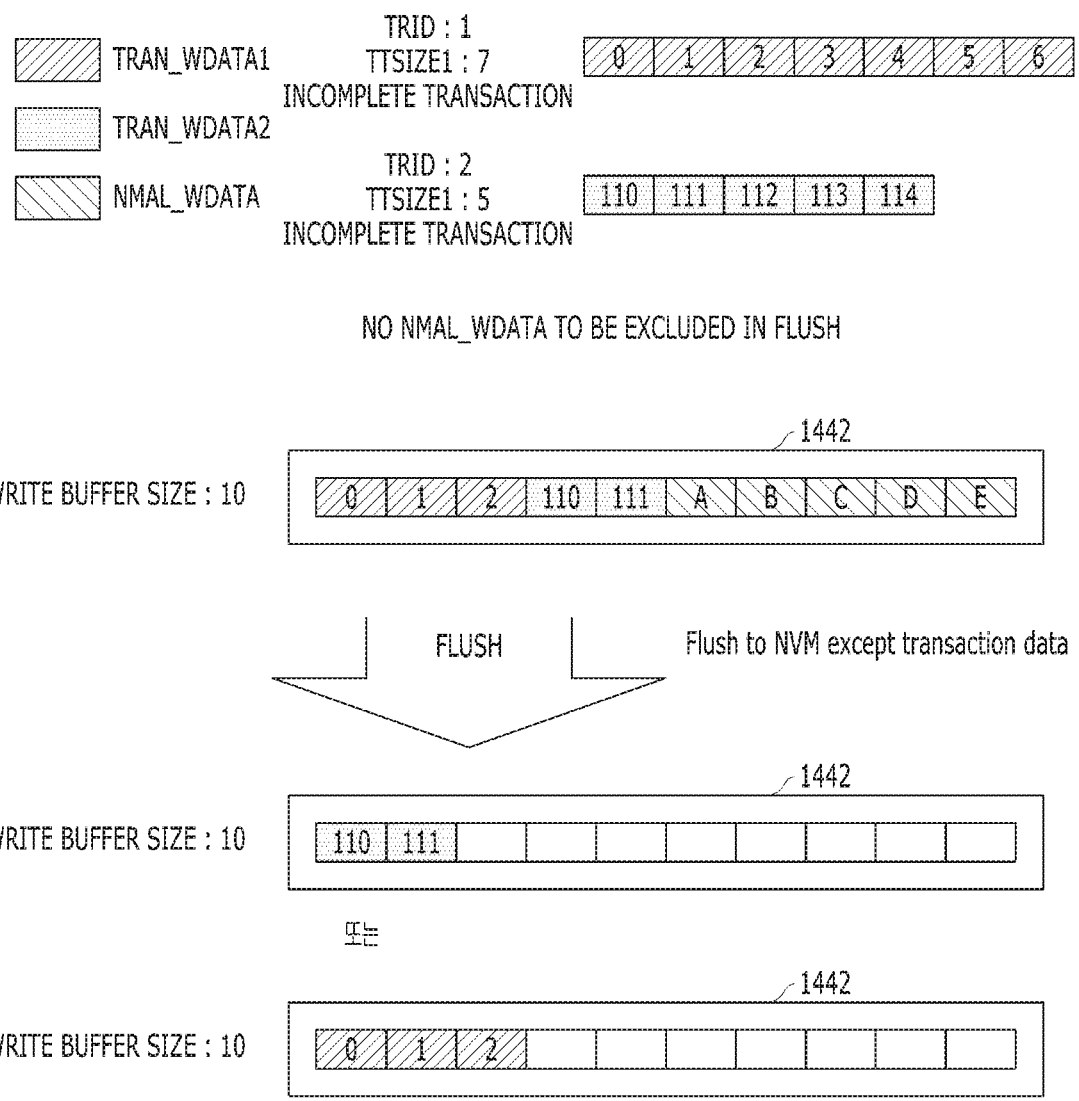

Referring to FIG. 6D, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442. Namely, it may be seen that the write data WDATA stored in the write buffer 1442 are the same as in the write buffer 1442 described above with reference to FIG. 6A.

The transaction management circuit 1300 may detect that first total size information TTSIZE1 of the first transaction is 7 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 7, that is, the number of total pieces of the first transaction data TRAN_WDATA1 needed for the first transaction to be committed is 7 of 0, 1, 2, 3, 4, 5 and 6.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that a second total size information TTSIZE2 of the second transaction is 5 and is not completed (INCOMPLETE TRANSACTION) and thus 110 and 111 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 5, that is, the number of total pieces of the second transaction data TRAN_WDATA2 needed for the second transaction to be committed is 5 of 110, 111, 112, 113 and 114.

Also, by checking through the operation 1302 described above with reference to FIGS. 5A and 5B that set commit information CMIF and set abort information ABIF are not included in each of 110 and 111 as the second transaction data TRAN_WDATA2, the transaction management circuit 1300 may detect that 110 and 111 as the second transaction data TRAN_WDATA2 are of the incomplete second transaction.

It may be assumed that not-flushed-in-simulation second write data to be excluded from the simulated flush operation among the second write data NMAL_WDATA do not exist.

Since the state of the write data WDATA is the same as in the write buffer 1442 described above with reference to FIG. 6A, it may be seen that a first calculated space, a second calculated space and a third calculated space are all the same as 10.

Then, the transaction management circuit 1300 checks a total size of the incomplete transactions as 12 by summing 7 as the first total size information TTSIZE1 of the first transaction and 5 as the second total size information TTSIZE2 of the second transaction.

Then, the transaction management circuit 1300 compares the first calculated space and the total size of the incomplete transactions through the operation 1311. In other words, 10 as the value of the first calculated space and 12 as the value of the total size of the incomplete transactions are compared.

As a result of the comparison, it may be seen that the first calculated space is smaller than the total size of the incomplete transactions. Accordingly, the transaction management circuit 1300 compares the second calculated space and the first total size information TTSIZE1, and compares the third calculated space and the second total size information TTSIZE2. In other words, the transaction management circuit 1300 compares 10 as the second calculated space and 7 as the first total size information TTSIZE1, and compares 10 as the third calculated space and 5 as the second total size information TTSIZE2.

As a result of the comparison, it may be seen that the second calculated space is larger than the first total size information TTSIZE1 and the third calculated space is larger than the second total size information TTSIZE2. Accordingly, the transaction management circuit 1300 determines to perform an actual flush operation with any one transaction data TRAN_WDATA1 or TRAN_WDATA2 of the first transaction data TRAN_WDATA1 and the second transaction data TRAN_WDATA2 are excluded from the actual flush operation, through the operation 1312.

If the actual flush operation is performed with the first transaction data TRAN_WDATA1 excluded from the actual flush operation, 0, 1 and 2 as the first transaction data TRAN_WDATA1 may be kept buffered in the write buffer 1442 even after the actual flush operation.

In this case, it may be seen that 110 and 111 as the second transaction data TRAN_WDATA2 and A, B, C, D and E as the second write data NMAL_WDATA are discarded as a result of the actual flush operation, to result in an empty space.

On the other hand, if the actual flush operation is performed with the second transaction data TRAN_WDATA2 excluded from the actual flush operation, 110 and 111 as the second transaction data TRAN_WDATA2 may be kept buffered in the write buffer 1442 even after the actual flush operation.

In this case, it may be seen that 0, 1 and 2 as the first transaction data TRAN_WDATA1 and A, B, C, D and E as the second write data NMAL_WDATA are discarded as a result of the actual flush operation, to result in an empty space.

Figure 6E:
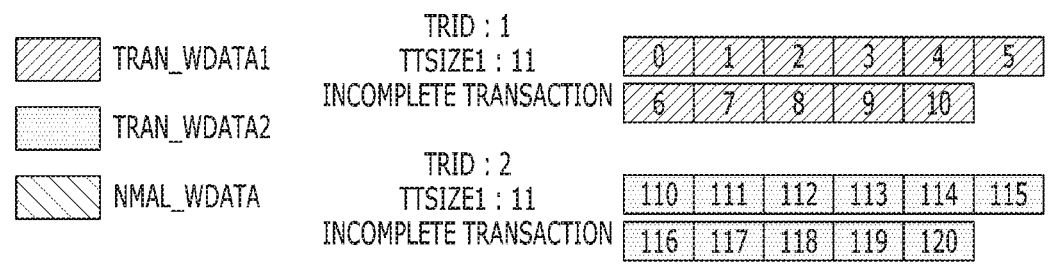
Figure 6E:
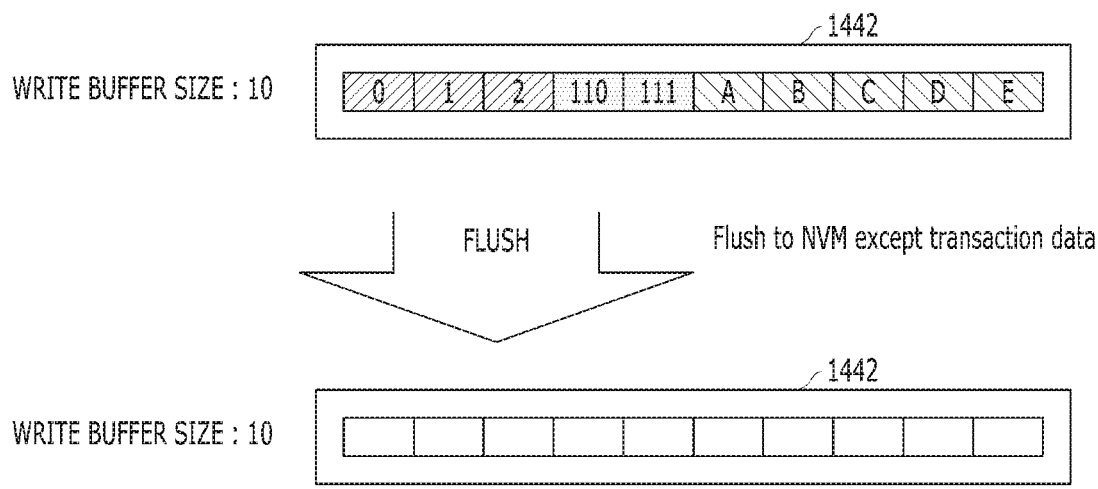

Referring to FIG. 6E, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442. Namely, it may be seen that the write data WDATA are the same as in the write buffer 1442 described above with reference to FIG. 6A.

The transaction management circuit 1300 may detect that a first total size information TTSIZE1 of the first transaction is 11 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 11, that is, the number of total pieces of the first transaction data TRAN_WDATA1 needed for the first transaction to be committed is 11 of 0, 1, 2, 3, 4, 5, 6, 7, 8, 9 and 10.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that a second total size information TTSIZE2 of the second transaction is 11 and is not completed (INCOMPLETE TRANSACTION) and thus 110 and 111 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 11, that is, the number of total pieces of the second transaction data TRAN_WDATA2 needed for the second transaction to be committed is 11 of 110, 111, 112, 113, 114, 115, 116, 117, 118, 119 and 120.

Also, by checking through the operation 1302 described above with reference to FIGS. 5A and 5B that set commit information CMIF and set abort information ABIF are not included in each of 110 and 111 as the second transaction data TRAN_WDATA2, the transaction management circuit 1300 may detect that 110 and 111 as the second transaction data TRAN_WDATA2 are of the incomplete second transaction.

It may be assumed that not-flushed-in-simulation second write data to be excluded from the simulated flush operation among the second write data NMAL_WDATA do not exist.

Since the state of the write data WDATA is the same as in the write buffer 1442 described above with reference to FIG. 6A, it may be seen that a first calculated space, a second calculated space and a third calculated space are all the same as 10.

Then, the transaction management circuit 1300 checks a total size of the incomplete transactions as 22 by summing 11 as the first total size information TTSIZE1 of the first transaction and 11 as the second total size information TTSIZE2 of the second transaction.

Then, the transaction management circuit 1300 compares the first calculated space and the total size of the incomplete transactions through the operation 1311. In other words, 10 as the value of the first calculated space and 22 as the value of the total size of the incomplete transactions are compared.

As a result of the comparison, it may be seen that the first calculated space is smaller than the total size of the incomplete transactions. Accordingly, the transaction management circuit 1300 compares the second calculated space and the first total size information TTSIZE1, and compares the third calculated space and the second total size information TTSIZE2. In other words, the transaction management circuit 1300 compares 10 as the second calculated space and 11 as the first total size information TTSIZE1, and compares 10 as the third calculated space and 11 as the second total size information TTSIZE2.

As a result of the comparison, it may be seen that the second calculated space is smaller than the first total size information TTSIZE1 and the third calculated space is smaller than the second total size information TTSIZE2. As a consequence, the transaction management circuit 1300 selects to perform an actual flush operation with the first transaction data TRAN_WDATA1 and the second transaction data TRAN_WDATA2 included the actual flush operation, through the operation 1312.

Therefore, as the actual flush operation is performed with both the first transaction data TRAN_WDATA1 and the second transaction data TRAN_WDATA2 included in the actual flush operation, all the data (i.e., 0, 1 and 2 as the first transaction data TRAN_WDATA1, 110 and 111 as the second transaction data TRAN_WDATA2 and A, B, C, D and E as the second write data NMAL_WDATA) are discarded as a result of the actual flush operation, to result in an empty space.

Figure 6F:
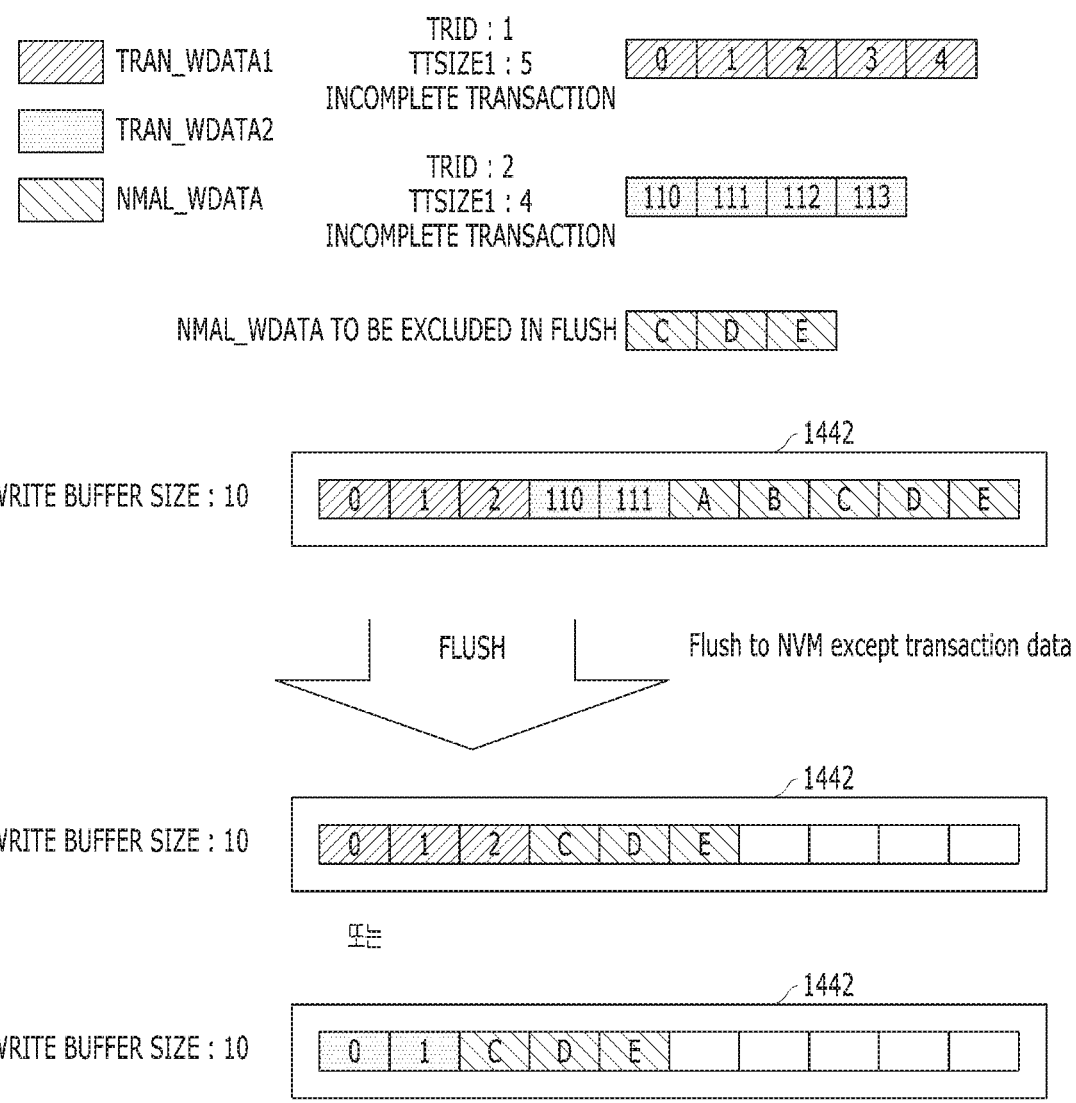

Referring to FIG. 6F, it may be seen that 0, 1 and 2 as first transaction data TRAN_WDATA1, 110 and 111 as second transaction data TRAN_WDATA2 and A, B, C, D and E as second write data NMAL_WDATA are stored in the write buffer 1442. Namely, it may be seen that the write data WDATA are the same as in the write buffer 1442 described above with reference to FIG. 6A.

The transaction management circuit 1300 may detect that first total size information TTSIZE1 of the first transaction is 5 and is not completed (INCOMPLETE TRANSACTION) and thus 0, 1 and 2 as the first transaction data TRAN_WDATA1 remain in the write buffer 1442.

Also, the transaction management circuit 1300 may detect that second total size information TTSIZE2 of the second transaction is 4 and is not completed (INCOMPLETE TRANSACTION) and thus 110 and 111 as the second transaction data TRAN_WDATA2 remain in the write buffer 1442.

That is to say, it may be seen that even the first total size information TTSIZE1 of the first transaction and the second total size information TTSIZE2 of the second transaction are the same as described above with reference to FIG. 6A.

However, in FIG. 6F, it may be assumed that not-flushed-in-simulation second write data to be excluded from the simulated flush operation among the second write data NMAL_WDATA exist. In other words, it may be assumed that C, D and E among A, B, C, D and E as the second write data NMAL_WDATA remain as not-flushed-in-simulation second write data in the write buffer 1442 even after the simulated flush operation is performed.

In this state, the transaction management circuit 1300 may calculate a first calculated space by summing the size of the first transaction data TRAN_WDATA1 left in the write buffer 1442, the size of the second transaction data TRAN_WDATA2 left in the write buffer 1442 and the size of an empty space to be left in the write buffer 1442 through the simulated flush operation with the first transaction data TRAN_WDATA1, the second transaction data TRAN_WDATA2 and the not-flushed-in-simulation second write data excluded from the simulated flush operation.

Also, the transaction management circuit 1300 may calculate a second calculated space by summing the size of the first transaction data TRAN_WDATA1 left in the write buffer 1442 and the size of an empty space to be left in the write buffer 1442 through the simulated flush operation with the first transaction data TRAN_WDATA1 and the not-flushed-in-simulation second write data excluded from the simulated flush operation.

Further, the transaction management circuit 1300 may calculate a third calculated space by summing the size of the second transaction data TRAN_WDATA2 left in the write buffer 1442 and the size of an empty space to be left in the write buffer 1442 through the simulated flush operation with the second transaction data TRAN_WDATA2 and the not-flushed-in-simulation second write data excluded from the simulated flush operation.

For example, as a result of the simulated flush operation with 0, 1 and 2 as the first transaction data TRAN_WDATA1, 110 and 111 as the second transaction data TRAN_WDATA2 and the not-flushed-in-simulation second write data C, D and E excluded from the simulated flush operation, the size of an empty space to be left in the write buffer 1442 is 2. Therefore, the first calculated space is 7 by summing 3 as the size of the first transaction data TRAN_WDATA1, 2 as the size of the second transaction data TRAN_WDATA2 and 2 as the size of an empty space.

As a result of the simulated flush operation with 0, 1 and 2 as the first transaction data TRAN_WDATA1 and C, D and E as the not-flushed-in-simulation second write data excluded from the simulated flush operation, the size of an empty space to be left in the write buffer 1442 is 4. Therefore, the second calculated space is 7 by summing 3 as the size of the first transaction data TRAN_WDATA1 and 4 as the size of an empty space.

As a result of the simulated flush operation with 110 and 111 as the second transaction data TRAN_WDATA2 and C, D and E as the not-flushed-in-simulation second write data excluded from the simulated flush operation, the size of an empty space to be left in the write buffer 1442 is 5. Therefore, the third calculated space is 7 by summing 2 as the size of the second transaction data TRAN_WDATA2 and 5 as the size of an empty space.

In this way, it may be seen that, even in the case where not-flushed-in-simulation second write data to be excluded from the simulated flush operation among the second write data NMAL_WDATA exist, the first calculated space, the second calculated space and the third calculated space are all the same.

Then, the transaction management circuit 1300 checks a total size of the incomplete transactions as 9 by summing 5 as the first total size information TTSIZE1 of the first transaction and 4 as the second total size information TTSIZE2 of the second transaction.

Then, the transaction management circuit 1300 compares the first calculated space and the total size of the incomplete transactions through the operation 1311. In other words, 7 as the value of the first calculated space and 9 as the value of the total size of the incomplete transactions are compared.

As a result of the comparison, it may be seen that the first calculated space is smaller than the total size of the incomplete transactions. Accordingly, the transaction management circuit 1300 compares the second calculated space and the first total size information TTSIZE1, and compares the third calculated space and the second total size information TTSIZE2. In other words, the transaction management circuit 1300 compares 7 as the second calculated space and 5 as the first total size information TTSIZE1, and compares 7 as the third calculated space and 4 as the second total size information TTSIZE2.

As a result of the comparison, it may be seen that the second calculated space is larger than the first total size information TTSIZE1 and the third calculated space is larger than the second total size information TTSIZE2. Accordingly, the transaction management circuit 1300 determines to perform an actual flush operation with any one transaction data TRAN_WDATA1 or TRAN_WDATA2 of the first transaction data TRAN_WDATA1 and the second transaction data TRAN_WDATA2 and the not-flushed-in-simulation second write data excluded from the actual flush operation, through the operation 1312.

If the actual flush operation is performed with the first transaction data TRAN_WDATA1 and the not-flushed-in-simulation second write data excluded from the actual flush operation, 0, 1 and 2 as the first transaction data TRAN_WDATA1 and C, D and E as the not-flushed-in-simulation second write data may be kept buffered in the write buffer 1442 even after the actual flush operation.

In this case, it may be seen that 110 and 111 as the second transaction data TRAN_WDATA2 and A and B as the remaining second write data NMAL_WDATA are discarded as a result of the actual flush operation, to result in an empty space.

If the actual flush operation is performed with the second transaction data TRAN_WDATA2 and the not-flushed-in-simulation second write data excluded from the actual flush operation, 110 and 111 as the second transaction data TRAN_WDATA2 and C, D and E as the not-flushed-in-simulation second write data may be kept buffered in the write buffer 1442 even after the actual flush operation.

In this case, it may be seen that 0, 1 and 2 as the first transaction data TRAN_WDATA1 and A and B as the remaining second write data NMAL_WDATA are discarded as a result of the actual flush operation, to result in an empty space.

Figure 7A:
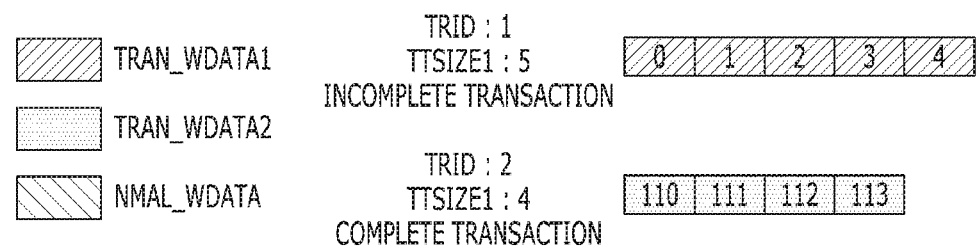
Figure 7A:
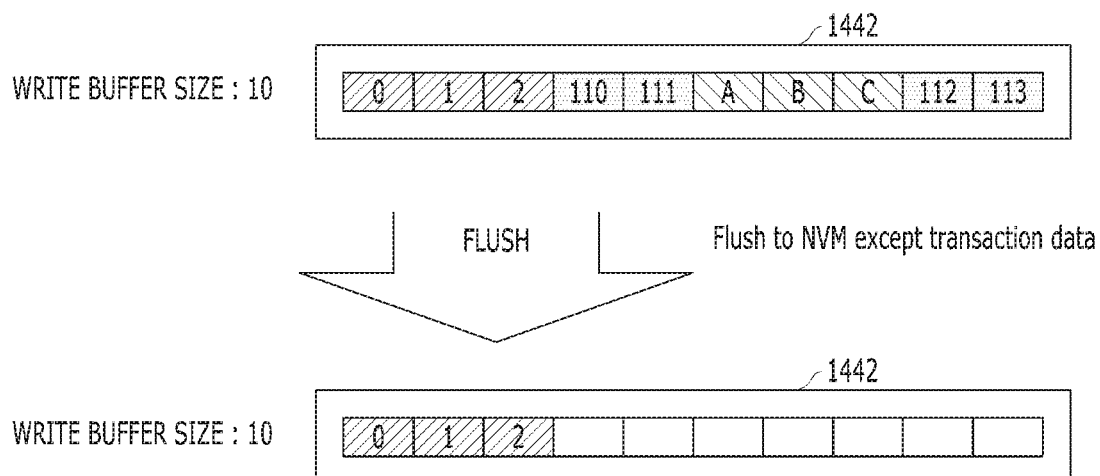

Referring to FIG. 7A, it may be seen that 0, 1 and 2 as first transaction data TRAN_WDATA1, 110, 111, 112 and 113 as second transaction data TRAN_WDATA2 and A, B and C as second write data NMAL_WDATA are stored in the write buffer 1442.

The transaction management circuit 1300 may detect that first total size information TTSIZE1 of the first transaction is 5 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 5, that is, the number of total pieces of the first transaction data TRAN_WDATA1 needed for the first transaction to be committed is 5 of 0, 1, 2, 3 and 4.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 4 and is completed (COMPLETE TRANSACTION) and 110, 111, 112 and 113 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 4, that is, the number of total pieces of the second transaction data TRAN_WDATA2 needed for the second transaction to be committed is 4 of 110, 111, 112 and 113.

Also, by checking through the operation 1302 described above with reference to FIGS. 5A and 5B that set commit information CMIF is included in any one data of 110, 111, 112 and 113 as the second transaction data TRAN_WDATA2, the transaction management circuit 1300 may detect that 110, 111, 112 and 113 as the second transaction data TRAN_WDATA2 are of the completed second transaction.

It may be assumed that not-flushed-in-simulation second write data to be excluded from the simulated flush operation among the second write data NMAL_WDATA do not exist.

In this state, the transaction management circuit 1300 may obtain a fourth calculated space by summing the size of the first transaction data TRAN_WDATA1 left in the write buffer 1442 and the size of an empty space to be left in the write buffer 1442 through the simulated flush operation with the first transaction data TRAN_WDATA1 excluded from the simulated flush operation.

For example, as a result of the simulated flush operation with 0, 1 and 2 as the first transaction data TRAN_WDATA1 excluded from the simulated flush operation, the size of an empty space to be left in the write buffer 1442 is 7. Therefore, the fourth calculated space is 10 by summing 3 as the size of the first transaction data TRAN_WDATA1 and 7 as the size of an empty space.

Then, the transaction management circuit 1300 compares the fourth calculated space and the first total size information TTSIZE1 through the operation 1311. In other words, 10 as the value of the fourth calculated space and 5 as the value of the first total size information TTSIZE1 are compared.

As a result of the comparison, it may be seen that the fourth calculated space is larger than the first total size information TTSIZE1. The transaction management circuit 1300 determines to perform an actual flush operation with the first transaction data TRAN_WDATA1 excluded from the actual flush operation, through the operation 1312.

Therefore, as the actual flush operation is performed with the first transaction data TRAN_WDATA1 excluded from the actual flush operation, 0, 1 and 2 as the first transaction data TRAN_WDATA1 may be kept buffered in the write buffer 1442 even after the actual flush operation.

Of course, it may be seen that 110, 111, 112 and 113 as the second transaction data TRAN_WDATA2 and A, B and C as the second write data NMAL_WDATA are discarded as a result of the actual flush operation, to result in an empty space.

Figure 7B:
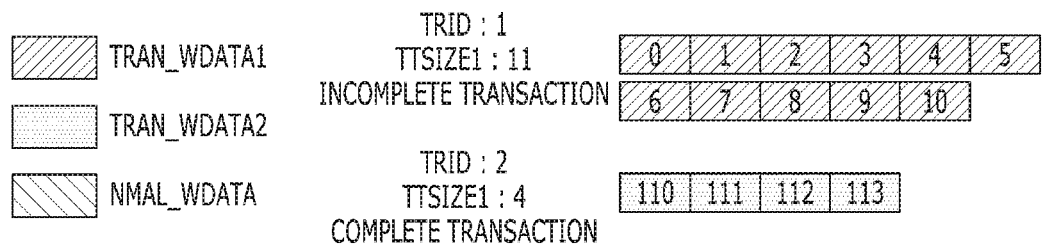
Figure 7B:
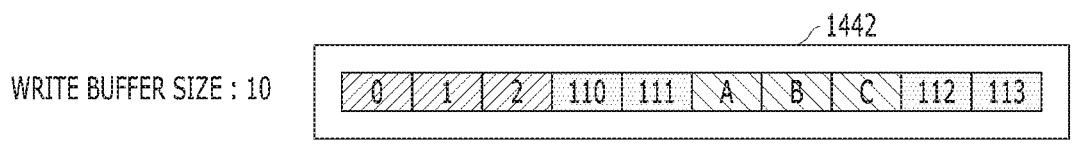
Figure 7B:
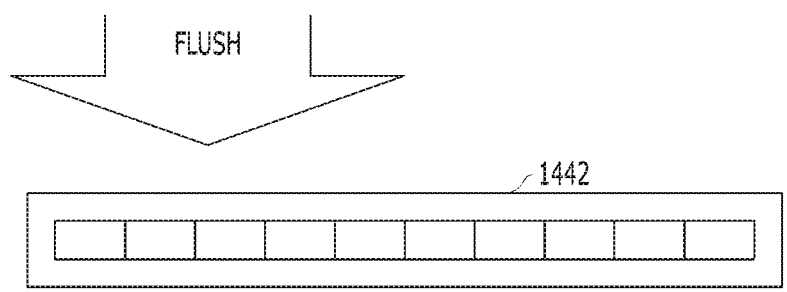

Referring to FIG. 7B, it may be seen that 0, 1 and 2 as first transaction data TRAN_WDATA1, 110, 111, 112 and 113 as second transaction data TRAN_WDATA2 and A, B and C as second write data NMAL_WDATA are stored in the write buffer 1442. Namely, it may be seen that the write data WDATA are the same as in the write buffer 1442 described above with reference to FIG. 7A.

The transaction management circuit 1300 may detect that first total size information TTSIZE1 of the first transaction is 11 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 11, that is, the number of total pieces of the first transaction data TRAN_WDATA1 needed for the first transaction to be committed is 11 of 0, 1, 2, 3, 4, 5, 6, 7, 8, 9 and 10.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 4 and is completed (COMPLETE TRANSACTION) and 110, 111, 112 and 113 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 4, that is, the number of total pieces of the second transaction data TRAN_WDATA2 needed for the second transaction to be committed is 4 of 110, 111, 112 and 113.

Also, by checking through the operation 1302 described above with reference to FIGS. 5A and 5B that set commit information CMIF is included in any one data of 110, 111, 112 and 113 as the second transaction data TRAN_WDATA2, the transaction management circuit 1300 may detect that 110, 111, 112 and 113 as the second transaction data TRAN_WDATA2 are of the completed second transaction.

It may be assumed that not-flushed-in-simulation second write data to be excluded from the simulated flush operation among the second write data NMAL_WDATA do not exist.

It may be seen that, since the write data WDATA is the same as in the write buffer 1442 described above with reference to FIG. 7A, a fourth calculated space is the same as 10.

Then, the transaction management circuit 1300 compares the fourth calculated space and the first total size information TTSIZE1 through the operation 1311. In other words, 10 as the value of the fourth calculated space and 11 as the value of the first total size information TTSIZE1 are compared.

As a result of the comparison, it may be seen that the fourth calculated space is smaller than the first total size information TTSIZE1. The transaction management circuit 1300 determines to perform an actual flush operation with the first transaction data TRAN_WDATA1 excluded from the actual flush operation, through the operation 1312.

Therefore, as the actual flush operation is performed with both the first transaction data TRAN_WDATA1 and the second transaction data TRAN_WDATA2 included in the actual flush operation, all the data (i.e., 0, 1 and 2 as the first transaction data TRAN_WDATA1, 110, 111, 112 and 113 as the second transaction data TRAN_WDATA2 and A, B and C as the second write data NMAL_WDATA) are discarded as a result of the actual flush operation, to result in an empty space.

Figure 8A:
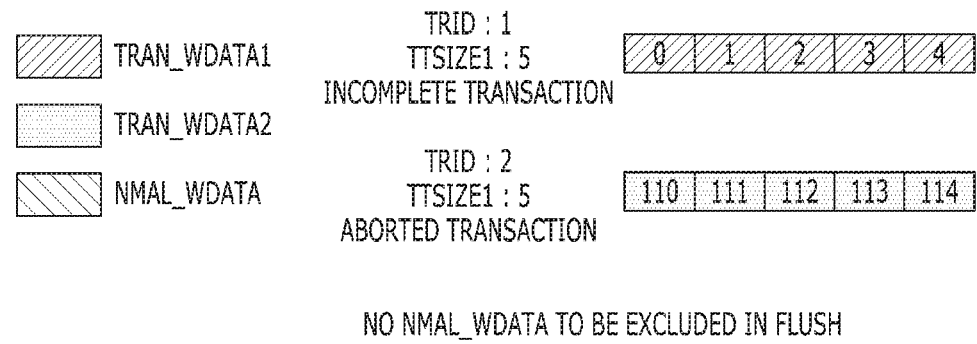
Figure 8A:
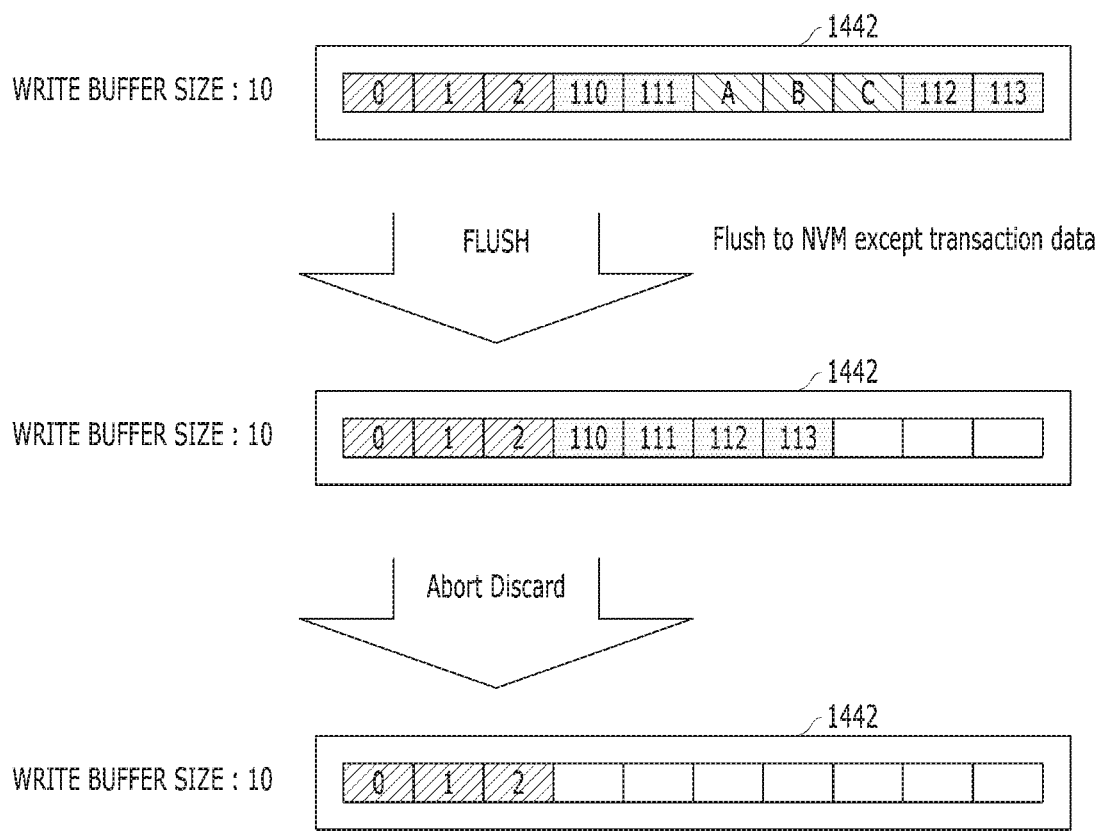

Referring to FIG. 8A, it may be seen that 0, 1 and 2 as first transaction data TRAN_WDATA1, 110, 111, 112 and 113 as second transaction data TRAN_WDATA2 and A, B and C as second write data NMAL_WDATA are stored in the write buffer 1442.

The transaction management circuit 1300 may detect that first total size information TTSIZE1 of the first transaction is 5 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction is 5, that is, the number of total pieces of the first transaction data TRAN_WDATA1 needed for the first transaction to be committed is 5 of 0, 1, 2, 3 and 4.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 5 is aborted (ABORTED TRANSACTION) and thus and 110, 111, 112 and 113 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction is 5, that is, the number of total pieces of the second transaction data TRAN_WDATA2 needed for the second transaction to be committed is 5 of 110, 111, 112, 113 and 114.

Also, by checking through the operation 1302 described above with reference to FIGS. 5A and 5B that set abort information ABIF is included in any one data of 110, 111, 112 and 113 as the second transaction data TRAN_WDATA2, the transaction management circuit 1300 may detect that 110, 111, 112 and 113 as the second transaction data TRAN_WDATA2 are of the aborted second transaction.

It may be assumed that not-flushed-in-simulation second write data to be excluded from the simulated flush operation among the second write data NMAL_WDATA do not exist.

In this state, the transaction management circuit 1300 may calculate a fifth calculated space by summing the size of the first transaction data TRAN_WDATA1 left in the write buffer 1442, the size of the second transaction data TRAN_WDATA2 left in the write buffer 1442 and the size of an empty space to be left in the write buffer 1442 through the simulated flush operation with the first transaction data TRAN_WDATA1 and the second transaction data TRAN_WDATA2 excluded from the simulated flush operation.

For example, as a result of the simulated flush operation with 0, 1 and 2 as the first transaction data TRAN_WDATA1 and 110, 111, 112 and 113 as the second transaction data TRAN_WDATA2 excluded from the actual flush operation, the size of potentially available space of the write buffer 1442 is 3. Therefore, the fifth calculated space is by summing 3 as the size of the first transaction data TRAN_WDATA1, 4 as the size of the second transaction data TRAN_WDATA2 in the aborted state and 3 as the size of an empty space.

Then, the transaction management circuit 1300 compares the fifth calculated space and the first total size information TTSIZE1 through the operation 1311. In other words, 10 as the value of the fifth calculated space and 5 as the value of the first total size information TTSIZE1 are compared.

As a result of the comparison, it may be seen that the fifth calculated space is larger than the first total size information TTSIZE1. The transaction management circuit 1300 determines to perform an actual flush operation with the first transaction data TRAN_WDATA1 and the second transaction data TRAN_WDATA2 excluded from the actual flush operation, through the operation 1312.

Therefore, as the actual flush operation is performed with the first transaction data TRAN_WDATA1 and the second transaction data TRAN_WDATA2 excluded from the actual flush operation, 0, 1 and 2 as the first transaction data TRAN_WDATA1 and 110, 111, 112 and 113 as the second transaction data TRAN_WDATA2 may be kept buffered in the write buffer 1442 even after the actual flush operation.

Of course, it may be seen that A, B and C as the second write data NMAL_WDATA are discarded as a result of the actual flush operation, to result in an empty space.

Also, 110, 111, 112 and 113 as the second transaction data TRAN_WDATA2 of the aborted second transaction are discarded after the actual flush operation, to finally become an empty space.

Figure 8B:
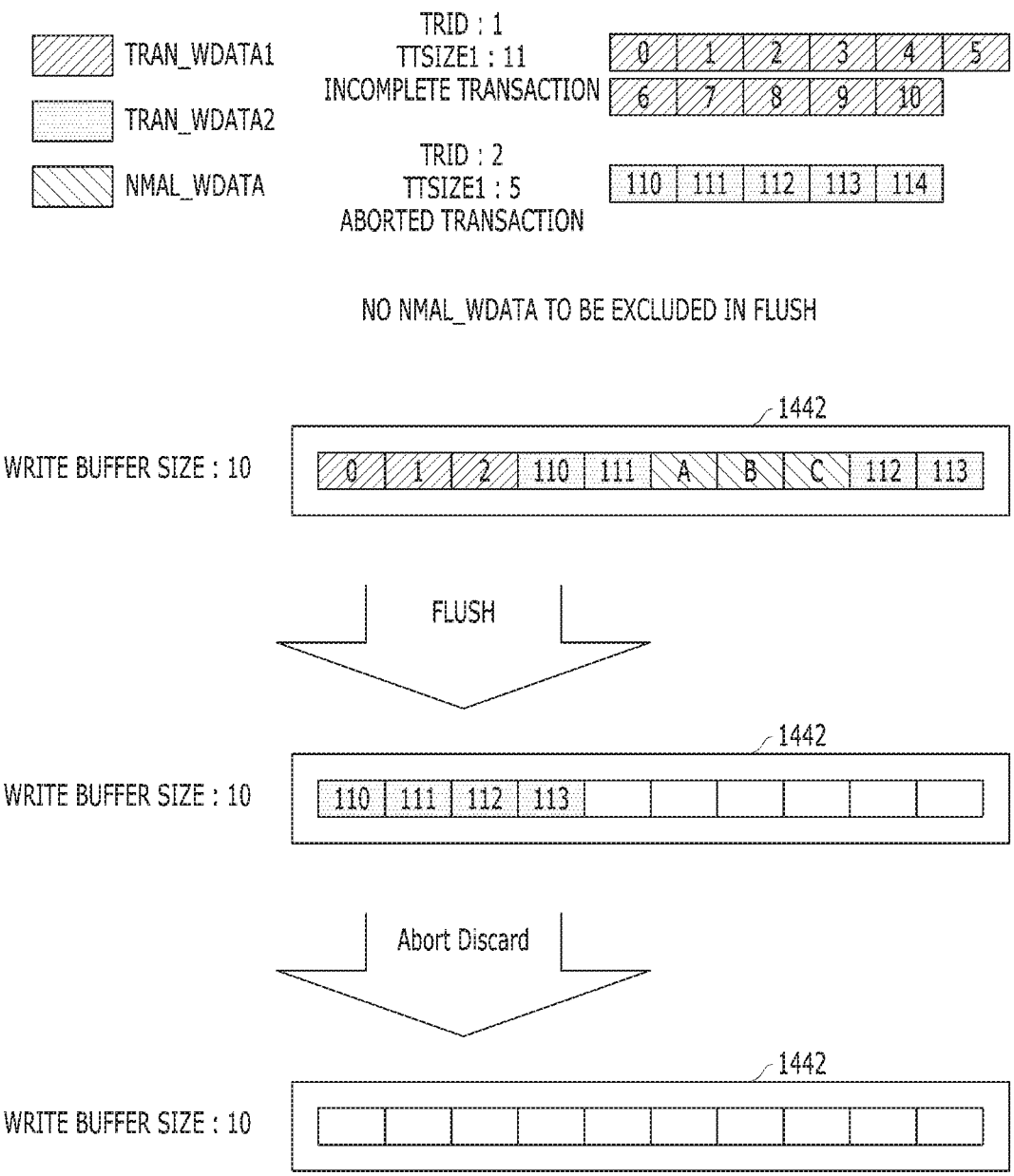

Referring to FIG. 8B, it may be seen that 0, 1 and 2 as first transaction data TRAN_WDATA1, 110, 111, 112 and 113 as second transaction data TRAN_WDATA2 and A, B and C as second write data NMAL_WDATA are stored in the write buffer 1442. Namely, it may be seen that the write data WDATA are the same as in the write buffer 1442 described above with reference to FIG. 8A.

The transaction management circuit 1300 may detect that first total size information TTSIZE1 of the first transaction is 11 and is not completed (INCOMPLETE TRANSACTION) and thus 0, 1 and 2 as the first transaction data TRAN_WDATA1 remain in the write buffer 1442.

That is to say, the transaction management circuit 1300 may detect, through the operation 1309 described above with reference to FIGS. 5A and 5B, that the first total size information TTSIZE1 of the first transaction data TRAN_WDATA1 is 11, that is, the number of total pieces of the first transaction data TRAN_WDATA1 needed for the first transaction to be committed is 11 of 0, 1, 2, 3, 4, 5, 6, 7, 8, 9 and 10.

Also, by checking through the operation 1302 described above with reference to FIGS. 5A and 5B that set commit information CMIF and set abort information ABIF are not included in each of 0, 1 and 2 as the first transaction data TRAN_WDATA1, the transaction management circuit 1300 may detect that 0, 1 and 2 as the first transaction data TRAN_WDATA1 are of the incomplete first transaction (INCOMPLETE TRANSACTION).

Also, the transaction management circuit 1300 may detect that second total size information TTSIZE2 of the second transaction is 5 and is aborted (ABORTED TRANSACTION) and thus 110, 111, 112 and 113 as the second transaction data TRAN_WDATA2 remain in the write buffer 1442.

That is to say, the transaction management circuit 1300 may detect, through the operation 1309 described above with reference to FIGS. 5A and 5B, that the second total size information TTSIZE2 of the second transaction data TRAN_WDATA2 is 5, that is, the number of total pieces of the second transaction data TRAN_WDATA2 needed for the second transaction to be committed is 5 of 110, 111, 112, 113 and 114.

Also, by checking through the operation 1302 described above with reference to FIGS. 5A and 5B that set abort information ABIF is included in any one data of 110, 111, 112 and 113 as the second transaction data TRAN_WDATA2, the transaction management circuit 1300 may detect that 110, 111, 112 and 113 as the second transaction data TRAN_WDATA2 are of the aborted second transaction.

It may be assumed that not-flushed-in-simulation second write data to be excluded from the simulated flush operation among the second write data NMAL_WDATA do not exist.

It may be seen that, since the state of the write data WDATA is the same as in the write buffer 1442 described above with reference to FIG. 8A, a fifth calculated space is the same as 10.

Then, the transaction management circuit 1300 compares the fifth calculated space and the first total size information TTSIZE1 through the operation 1311. In other words, 10 as the value of the fifth calculated space and 11 as the value of the first total size information TTSIZE1 are compared.

As a result of the comparison, it may be seen that the fifth calculated space is smaller than the first total size information TTSIZE1. The transaction management circuit 1300 determines to perform an actual flush operation with the second transaction data TRAN_WDATA2 excluded from the actual flush operation, through the operation 1312.

Therefore, as the actual flush operation is performed with the second transaction data TRAN_WDATA2 excluded from the actual flush operation, 110, 111, 112 and 113 as the second transaction data TRAN_WDATA2 may be kept buffered in the write buffer 1442 even after the actual flush operation.

Of course, it may be seen that 0, 1 and 2 as the first transaction data TRAN_WDATA1 and A, B and C as the second write data NMAL_WDATA are discarded as a result of the actual flush operation, to result in an empty space.

Also, 110, 111, 112 and 113 as the second transaction data TRAN_WDATA2 of the aborted second transaction are discarded after the actual flush operation, to finally become an empty space.

For reference, although not directly mentioned in the above explanation of FIGS. 6A to 6F, FIGS. 7A and 7B and FIGS. 8A and 8B, these drawings illustrate examples on the assumption that times for which the first transaction data TRAN_WDATA1 and the second transaction data TRAN_WDATA2 have been stored in the write buffer 1442 are all shorter than the designated threshold time.

If the first transaction data TRAN_WDATA1 and/or the second transaction data TRAN_WDATA2 have been stored for at least the designated threshold time, the corresponding transaction data TRAN_WDATA1 and/or TRAN_WDATA2 are flushed to the nonvolatile memory device 150, and are discarded from the write buffer 1442.

Figure 9:
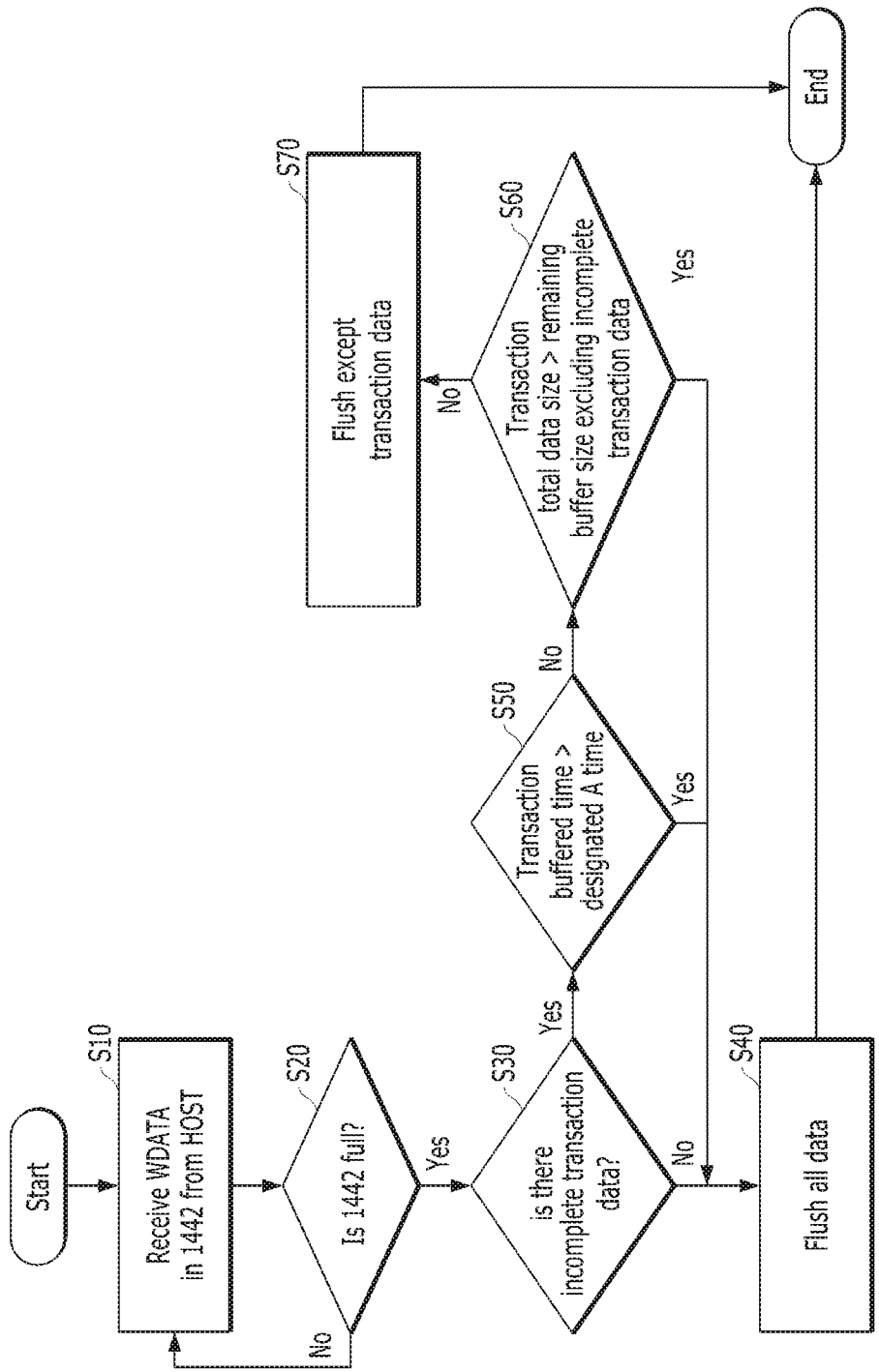
FIG. 9 is a flow chart illustrating an operation of storing a plurality of write data grouped into a transaction, in a nonvolatile memory device, in the memory system in accordance with an embodiment of the present disclosure.

FIG. 9 is a flow chart to assist in the explanation of an operation of storing a write data grouped into a transaction, in a nonvolatile memory device, in the memory system in accordance with an embodiment of the present disclosure.

Referring to FIG. 9, the sequence of operations of storing a plurality of pieces of write data which are grouped into a transaction in the nonvolatile memory device 150, in accordance with embodiments of the present disclosure described above with reference to FIGS. 5A to 8B, is described below.

First, write data WDATA are transferred from the host 102 and are stored in the write buffer 1442 at step S10.

Then, whether the write buffer 1442 is full of the write data WDATA is determined at step S20. As an example of the operation S20, whether a storage space allocated as the write buffer 1442 in the volatile memory device 144 is full of the write data WDATA may be determined.

In the case where, at the operation S20, it is determined that the write buffer 1442 is not yet full of the write data WDATA (No), the operation S10 is performed again.

In the case where, at the operation S20, it is determined that the write buffer 1442 is full of the write data WDATA (Yes), an actual flush operation may be performed for the write buffer 1442. Before performing the actual flush operation, whether first write data TRAN_WDATA of an incomplete transaction exist in the write buffer 1442 is determined at step S30.

In the case where, as a result of the operation S30, there is no first write data TRAN_WDATA of an incomplete transaction in the write buffer 1442 (No), the actual flush operation is performed to flush the buffered write data WDATA into the nonvolatile memory device 150 at step S40.

In the case where, as a result of the operation S30, there is first write data TRAN_WDATA of an incomplete transaction in the write buffer 1442 (Yes), whether a buffered time for which the first write data TRAN_WDATA corresponding to the incomplete transaction have been stored in the write buffer 1442 exceeds a designated threshold A time is determined at step S50.

In the case where, as a result of the operation S50, the buffered time of the first write data TRAN_WDATA corresponding to the incomplete transaction exceeds the designated threshold A time (Yes), the actual flush operation is performed with the first write data TRAN_WDATA corresponding to the incomplete transaction included in the actual flush operation at step S40.

In the case where, as a result of the operation S50, the buffered time, for which the first write data TRAN_WDATA corresponding to the incomplete transaction have been stored in the write buffer 1442, is equal to or shorter than the designated threshold A time (No), whether the total size information TTSIZE required for the incomplete transaction to be committed, that is, the total transaction data size of the first write data TRAN_WDATA corresponding to the incomplete transaction, is a size capable of being stored all in the left space of the write buffer 1442 is determined at step S60.

In the case where, as a result of the step S60, the total size information TTSIZE required for the incomplete transaction to be committed, that is, the total transaction data size of the first write data TRAN_WDATA corresponding to the incomplete transaction, is determined as a size not capable of being stored all in the left space of the write buffer 1442 (Yes), a flush operation is performed for the write buffer 1442 in a state in which the first write data TRAN_WDATA corresponding to the incomplete transaction is included at step S40.

In the case where, as a result of the step S60, the total size information TTSIZE required for the incomplete transaction to be committed, that is, the total transaction data size of the first write data TRAN_WDATA corresponding to the incomplete transaction, is determined as a size capable of being stored all in the left space of the write buffer 1442 (No), the actual flush operation is performed for the write buffer 1442 with the first write data TRAN_WDATA corresponding to the incomplete transaction excluded from the actual flush operation at step S70.

Now, detailed description will be made, with reference to FIGS. 10 to 18, of a data processing system and electronic appliances to which the memory system 110 including the memory device 150 and the controller 130 described above with reference to FIGS. 1 to 9 may be applied.

FIGS. 10 to 18 are diagrams schematically illustrating application examples of the data processing system of FIG. 1.

Figure 10:
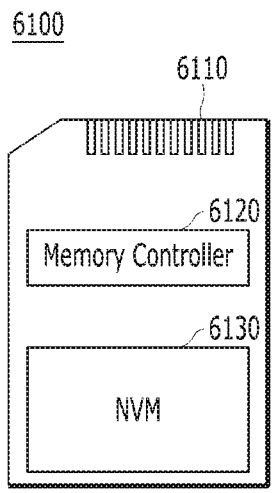
FIGS. 10 to 18 are diagrams schematically illustrating application examples of the data processing system shown in FIG. 1 in accordance with various embodiments of the present invention.

FIG. 10 is a diagram schematically illustrating another example of the data processing system including the memory system in accordance with an embodiment. FIG. 10 schematically illustrates a memory card system to which the memory system is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1, 5A and 5B, and the memory device 6130 may correspond to the memory device 150 of the memory system 110 described with reference to FIGS. 1, 5A and 5B.

Thus, the memory controller 6120 may include a RAM, a processor, a host interface, a memory interface and an error correction component. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
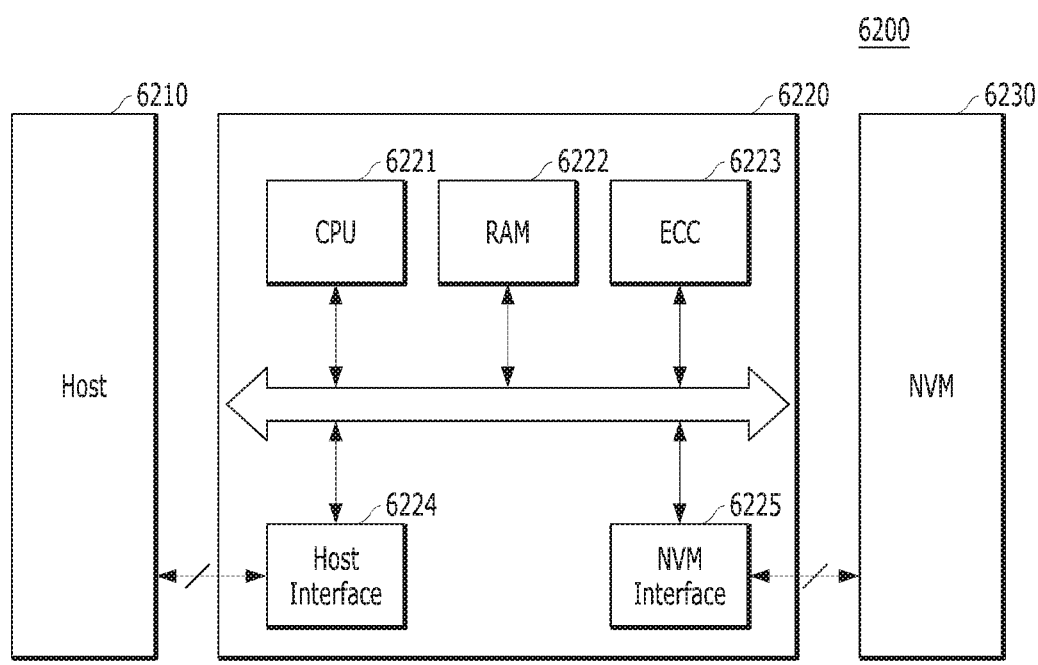

FIG. 11 is a diagram schematically Illustrating another example of the data processing system including the memory system in accordance with an embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1, 5A and 5B, and the memory controller 6220 may correspond to the controller 130 in the memory system 110 illustrated in FIGS. 1, 5A and 5B.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224, and exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WIFI or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system may be applied to wired/wireless electronic devices, particularly a mobile electronic device.

Figure 12:
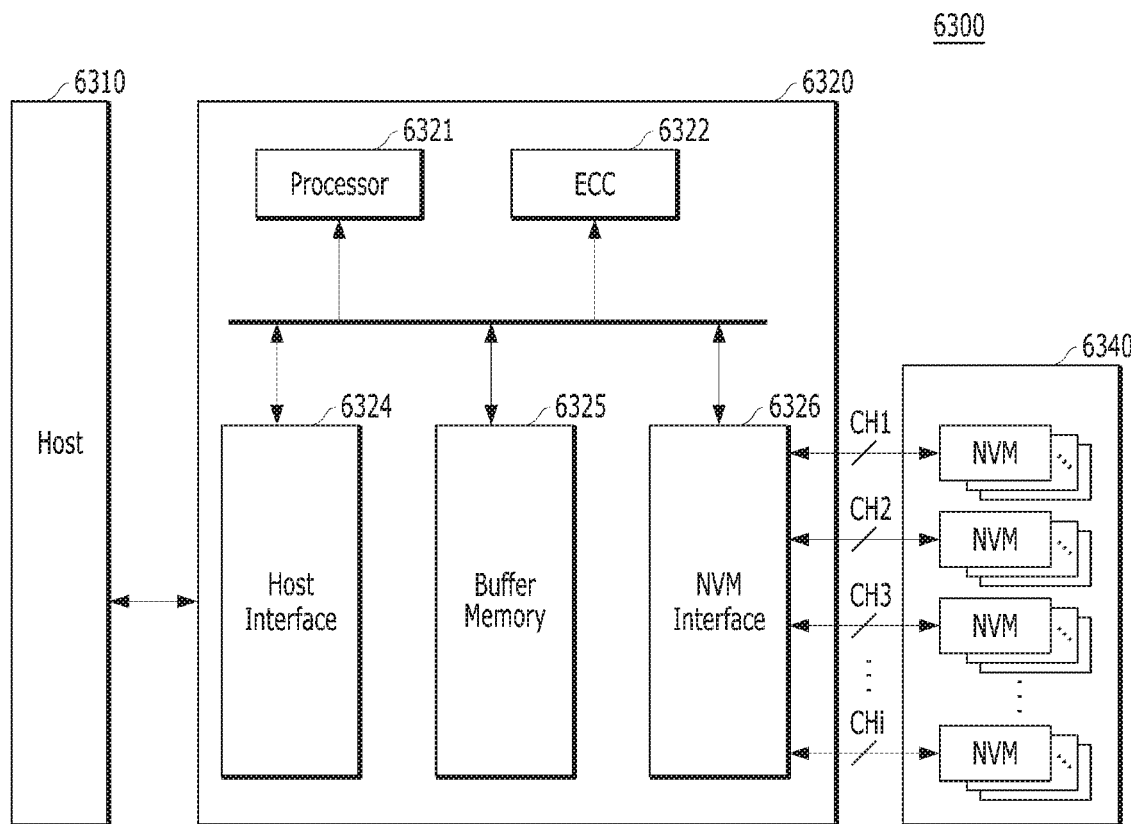

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIGS. 1, 5A and 5B, and the memory device 6340 may correspond to the memory device 150 in the memory system of FIGS. 1, 5A and 5B.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 11 illustrates that the buffer memory 6325 exists in the controller 6320. However, the buffer memory 6325 may disposed externally to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1, 5A and 5B is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
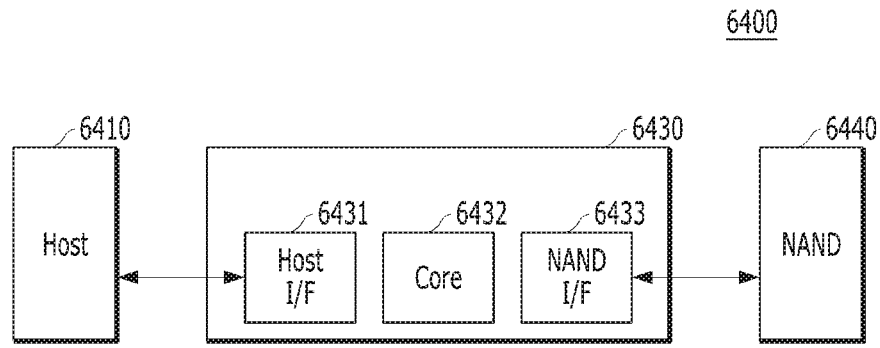

FIG. 13 is a diagram schematically illustrating another example of the data processing system including the memory system in accordance with an embodiment. FIG. 13 schematically illustrates an embedded Multi-Media Card (eMMC) to which the memory system is applied.

Referring to FIG. 13, the eMMC 6400 may include a controller 6430 and a memory device 6440 embodied by one or more NAND flash memories. The controller 6430 may correspond to the controller 130 in the memory system 110 of FIGS. 1, 5A and 5B, and the memory device 6440 may correspond to the memory device 150 in the memory system 110 of FIGS. 1, 5A and 5B.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with other embodiments. FIGS. 14 to 17 schematically illustrate UFS (Universal Flash Storage) systems to which the memory system is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1, 5A and 5B. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
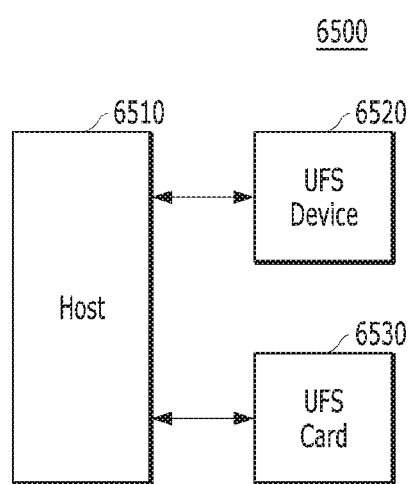

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 14, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
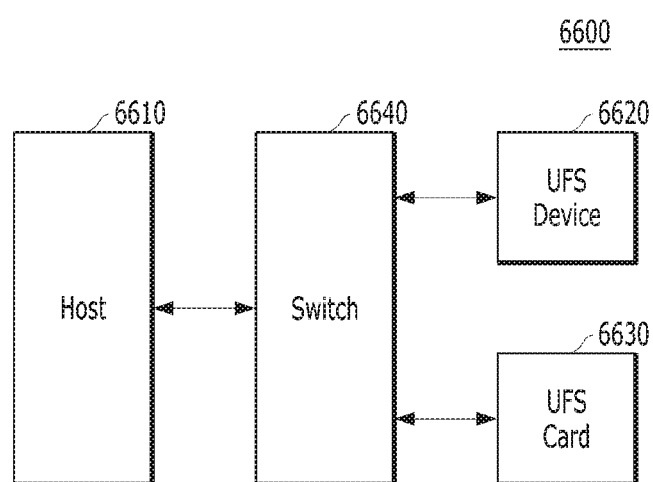

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 15, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 16:
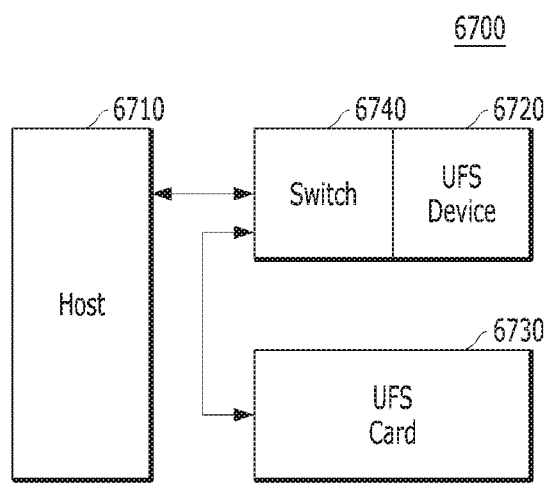

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 within or externally to the UFS device 6720. In the embodiment of FIG. 16, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
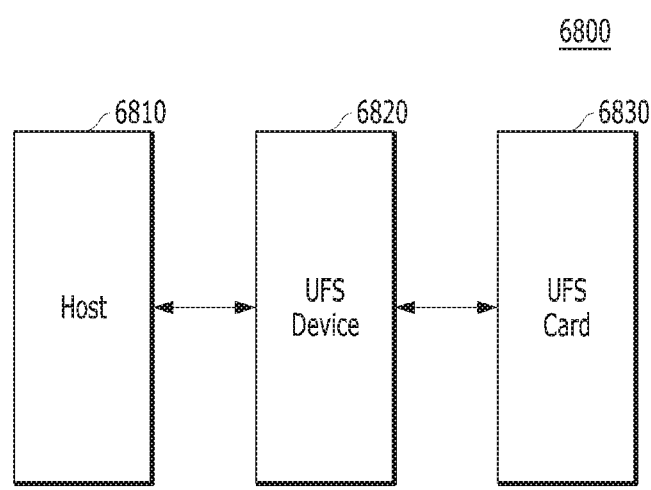

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 17, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
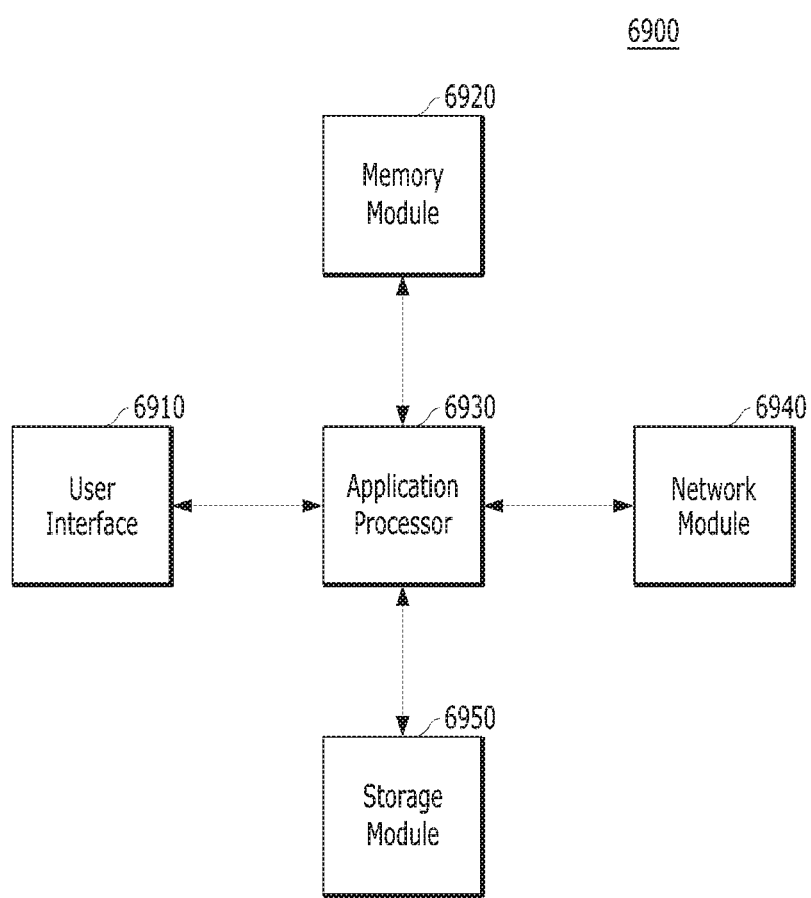

FIG. 18 is a diagram schematically illustrating another example of the data processing system including the memory system in accordance with an embodiment of the present invention. FIG. 18 is a diagram schematically illustrating a user system to which the memory system is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA- 2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1, 5A and 5B. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1, 5A and 5B is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In embodiments of the present disclosure, after temporarily storing write data grouped into transactions, in a write buffer in a memory system, when storing the write data in memory blocks through a flush operation for the write buffer, a method of storing write data grouped into a transaction of which commit is not completed, in a nonvolatile memory device, is adjusted.

As a consequence, it is possible to store write data grouped into a transaction of which commit is not completed, in the nonvolatile memory device, at an optimal time.

Although various embodiments have been illustrated and described, it will be apparent to those skilled in the art in light of the present disclosure that various changes and modifications may be made without departing from the spirit and scope of the invention as defined in the following claims.

What is claimed is:

1. A memory system comprising:
   a nonvolatile memory device;
   a write buffer suitable for temporarily storing plural pieces of write data inputted from a host; and
   a controller suitable for, when, among the write data, first write data which are grouped into a transaction and second write data which are not grouped into a transaction are inputted to the write buffer, receiving total size information of a transaction for completion of commit of the first write data corresponding to the transaction, from the host,
   wherein the controller further:
   checks, at a time of performing an actual flush operation for the write buffer, whether or not the commit of the first write data is completed;
   checks, in the case where it is determined that commit-uncompleted first write data are included in the write buffer, a size of a space left in the write buffer by simulating a flush operation with the commit-uncompleted first write data excluded from the simulated flush operation;
   compares a checked size of the space left in the write buffer and the total size information; and
   determines whether to include the commit-uncompleted first write data in the actual flush operation depending on a comparison result.

2. The memory system according to claim 1,
   wherein the controller further checks, in the case where it is determined that the commit-uncompleted first write data are included in the write buffer, a buffer time for which the commit-uncompleted first write data have been stored in the write buffer, and
   wherein the controller includes, in the case where it is determined that the buffered time is greater than or equal to a threshold time, the commit-uncompleted first write data in the flush operation.

3. The memory system according to claim 2,
   wherein the controller receives a plurality of write commands respectively corresponding to the plural pieces of write data, from the host,
   wherein transaction information of a corresponding piece of the write data is included in each of the write commands,
   wherein transaction identification (ID) Information, commit information and abort information of the corresponding piece of the write data are included in the transaction information, and
   wherein the total size information is additionally included in a write command corresponding to a first piece of the first write data.

4. The memory system according to claim 3, wherein the controller classifies, by checking the transaction ID information, write data of which transaction ID information are set to a specific value, as the first write data, and classifies write data of which transaction ID information are not set, as the second write data.

5. The memory system according to claim 4,
   wherein, when first write data which are defined as first transaction data and of which transaction ID information are set to a first value are inputted to the write buffer from the host, the controller receives first total size information for completion of commit of the first transaction data, from the host,
   wherein, when first write data which are defined as second transaction data and of which transaction ID information are set to a second value are inputted to the write buffer from the host, the controller receives second total size information required for completion of commit of the second transaction data, from the host, and
   wherein the controller performs the actual flush operation when the write buffer is full of the write data.

6. The memory system according to claim 5,
wherein, in the case where it is determined that, at the time of performing the actual flush operation, commit information and abort information are not included in the transaction information of the respective first and second transaction data and it is determined that the respective first and second transaction data have been stored in the write buffer for a time shorter than the designated threshold time, the controller further:
obtains a first calculated space by summing sizes of the first transaction data and the second transaction data left in the write buffer and a size of an empty space, as a result of simulating the flush operation with the first and second transaction data and not-flushed-in-simulation second write data excluded from the simulated flush operation,
obtains a second calculated space by summing the size of the first transaction data left in the write buffer and the size of the empty space, as a result of simulating of the flush operation with the first transaction data and the not-flushed-in-simulation second write data excluded from the simulated flush operation; and
obtains a third calculated space by summing the size of the second transaction data left in the write buffer and the size of the empty space, as a result of simulating the flush operation with the second transaction data and the not-flushed-in-simulation second write data excluded from the simulated flush operation, and
wherein the not-flushed-in-simulation second write data is to be excluded from the actual flush operation among the second write data stored in the write buffer.

7. The memory system according to claim 6, wherein, when the first calculated space is equal to or larger than the total size of the incomplete transactions obtained by summing the first total size information and the second total size information, the controller performs the actual flush operation with the first and second transaction data and the not-flushed-in-simulation second write data excluded from the actual flush operation.

8. The memory system according to claim 7, wherein, in the case where the first calculated space is smaller than the total size of the incomplete transactions, the controller performs:
the actual flush operation with any one transaction data of the first transaction data and the second transaction data and the not-flushed-in-simulation second write data excluded from the actual flush operation, in the case where the second calculated space is equal to or larger than the first total size information and the third calculated space is equal to or larger than the second total size information;
the actual flush operation with the first transaction data and the not-flushed-in-simulation second write data excluded from the actual flush operation, in the case where the second calculated space is equal to or larger than the first total size information and the third calculated space is smaller than the second total size information;
the actual flush operation with the second transaction data and the not-flushed-in-simulation second write data excluded from the actual flush operation, in the case where the second calculated space is smaller than the first total size information and the third calculated space is equal to or larger than the second total size information; and
the actual flush operation with the not-flushed-in-simulation second write data excluded from the actual flush operation, in the case where the second calculated space is smaller than the first total size information and the third calculated space is smaller than the second total size information.

9. The memory system according to claim 5,
wherein, in the case where it is determined that, at the time of performing the actual flush operation, commit information and abort information are not included in the transaction information of the respective first transaction data and commit information is included in the transaction information of the respective second transaction data and it is determined that the first transaction data have been stored in the write buffer for a time shorter than the designated threshold time, the controller further:
calculates a fourth calculated space by summing a size of the first transaction data left in the write buffer and the size of an empty space, as a result of simulating the flush operation with the first transaction data and not-flushed-in-simulation second write data excluded from the simulated flush operation;
performs the actual flush operation with the first transaction data and the not-flushed-in-simulation second write data excluded from the actual flush operation, in the case where the fourth calculated space is equal to or larger than the first total size information; and
performs the actual flush operation with the not-flushed-in-simulation second write data excluded from the actual flush operation, in the case where the fourth calculated space is smaller than the first total size information, and
wherein the not-flushed-in-simulation second write data is to be excluded from the actual flush operation among the second write data stored in the write buffer.

10. The memory system according to claim 5,
wherein, in the case where it is determined that, at the time of performing the flush operation, commit information and abort information are not included in the transaction information of the respective first transaction data and abort information is included in the transaction information of the respective second transaction data and it is determined that the first transaction data have been stored in the write buffer for a time shorter than the designated threshold time, the controller further:
obtains a fifth calculated space by summing a size of the first transaction data left in the write buffer, a size of the second transaction data which are in an aborted state and the size of an empty space, as a result of simulating the flush operation with the first and second transaction data and not-flushed-in-simulation second write data excluded from the simulated flush operation;
performs the actual flush operation with the first and second transaction data and the not-flushed-in-simulation second write data excluded from the actual flush operation, in the case where the fifth calculated space is equal to or larger than the first total size information; and
performs the actual flush operation with the second transaction data and the not-flushed-in-simulation second write data excluded from the actual flush operation, in the case where the fifth calculated space is smaller than the first total size information, and
wherein the not-flushed-in-simulation second write data is to be excluded from the actual flush operation among the second write data stored in the write buffer.

11. A method for operating a memory system including a nonvolatile memory device and a write buffer for temporarily storing a write data inputted from a host, the method comprising:
   a first receiving operation of receiving, when first write data, among the write data, which are grouped into a transaction and second write data which are not grouped into a transaction are inputted to the write buffer, total size information of a transaction for completion of commit of the first write data corresponding to the transaction, from the host;
   a first checking operation of checking, at a time of performing an actual flush operation for the write buffer, whether or not the commit of the first write data is completed;
   a second checking operation of checking, in the case where it is determined at the first checking operation that incomplete first write data are included in the write buffer, a size of a space left in the write buffer by simulating a flush operation with the commit-uncompleted first write data excluded from the simulated flush operation;
   comparing a checked size of the space left in the write buffer and the total size information; and
   determining whether to include the commit-uncompleted first write data in the actual flush operation depending on a comparison result.

12. The method according to claim 11, further comprising:
   a third checking operation of checking, in the case where it is determined at the first checking operation that the incomplete first write data are included in the write buffer, a buffer time for which the commit-uncompleted first write data have been stored in the write buffer;
   including performing the third checking operation when it is determined that the buffered time is greater than or equal to a designated threshold time, the commit-uncompleted first write data in the flush operation.

13. The method according to claim 12, further comprising:
   a second receiving operation of receiving a plurality of write commands respectively corresponding to the plural pieces of write data, from the host;
   wherein transaction information of a corresponding piece of the write data is included in each of the write commands,
   wherein transaction identification (ID) information, commit information and abort information of the corresponding piece of the write data are included in the transaction information, and
   wherein the total size information is additionally included in a write command corresponding to a first piece among the first write data.

14. The method according to claim 13, further comprising:
   a first classifying operation of classifying, by checking transaction ID information, write data of which transaction ID information are set to a specific value, into the first write data; and
   a second classifying operation of classifying, by checking transaction ID information, write data of which transaction ID information are not set, into the second write data.

15. The method according to claim 14, further comprising performing the actual flush operation when the write buffer is full of the write data,
   wherein the first receiving operation comprises:
   receiving, when first write data which are defined as first transaction data and of which transaction ID information are set to a first value are inputted to the write buffer from the host, first total size information required for completion of commit of the first transaction data, from the host,
   receiving, when first write data which are defined as second transaction data and of which transaction ID information are set to a second value are inputted to the write buffer from the host, second total size information required for completion of commit of the second transaction data, from the host.

16. The method according to claim 15,
   wherein, when it is determined that, at the time of performing the actual flush operation, commit information and abort information are not included in the transaction information of the respective first and second transaction data and it is determined that the respective first and second transaction data have been buffered in the write buffer for a time shorter than the designated threshold time, the second checking act comprises:
   obtaining a first calculated space by summing sizes of the first transaction data and the second transaction data left in the write buffer and a size of an empty space, as a result of simulating the flush operation with the first and second transaction data and not-flushed-in-simulation second write data excluded from the simulated flush operation,
   obtaining a second calculated space by summing the size of the first transaction data left in the write buffer and the size of the empty space, as a result of simulating of the flush operation with the first transaction data and the not-flushed-in-simulation second write data excluded from the simulated flush operation; and
   obtaining a third calculated space by summing the size of the second transaction data left in the write buffer and the size of the empty space, as a result of simulating the flush operation with the second transaction data and the not-flushed-in-simulation second write data excluded from the simulated flush operation, and
   wherein the not-flushed-in-simulation second write data is to be excluded from the actual flush operation among the second write data stored in the write buffer.

17. The method according to claim 16, wherein the actual flush operation is performed with the first and second transaction data and the not-flushed-in-simulation second write data excluded from the actual flush operation when the first calculated space is equal to or larger than the total size of the incomplete transactions obtained by summing the first total size information and the second total size information.

18. The method according to claim 17, wherein when the first calculated space is smaller than the total size of the incomplete transactions, the flush performing act comprises performing:
   the actual flush operation with any one transaction data of the first transaction data and the second transaction data and the not-flushed-in-simulation second write data excluded from the actual flush operation, when the second calculated space is equal to or larger than the first total size information and the third calculated space is equal to or larger than the second total size information;
   the actual flush operation with the first transaction data and the not-flushed-in-simulation second write data excluded from the actual flush operation, when the second calculated space is equal to or larger than the first total size information and the third calculated space is smaller than the second total size information;

the actual flush operation with the second transaction data and the not-flushed-in-simulation second write data excluded from the actual flush operation, when the second calculated space is smaller than the first total size information and the third calculated space is equal to or larger than the second total size information; and the actual flush operation with the not-flushed-in-simulation second write data excluded from the actual flush operation, when the second calculated space is smaller than the first total size information and the third calculated space is smaller than the second total size information.

19. The method according to claim 15, wherein the second checking operation further comprises, when it is determined that, at the time of performing the actual flush operation, commit information and abort information are not included in the transaction information of the respective first transaction data and commit information is included in the transaction information of the respective second transaction data and it is determined that the first transaction data have been stored in the write buffer for a time shorter than the designated threshold time, calculating a fourth calculated space by summing a size of the first transaction data left in the write buffer and the size of an empty space, as a result of simulating the flush operation with the first transaction data and not-flushed-in-simulation second write data excluded from the simulated flush operation, wherein the flush performing act further comprises performing:

the actual flush operation with the first transaction data and the not-flushed-in-simulation second write data excluded from the actual flush operation, when the fourth calculated space is equal to or larger than the first total size information; and the actual flush operation with the not-flushed-in-simulation second write data excluded from the actual flush operation, when the fourth calculated space is smaller than the first total size information, and wherein the not-flushed-in-simulation second write data is to be excluded from the actual flush operation among the second write data stored in the write buffer.

20. The method according to claim 15, wherein the second checking operation further comprises, when it is determined that, at the time of performing the flush operation, commit information and abort information are not included in the transaction information of the respective first transaction data and abort information is included in the transaction information of the respective second transaction data and it is determined that the first transaction data have been stored in the write buffer for a time shorter than the designated threshold time, obtaining a fifth calculated space by summing a size of the first transaction data left in the write buffer, a size of the second transaction data which are in an aborted state and the size of an empty space, as a result of simulating the flush operation with the first and second transaction data and not-flushed-in-simulation second write data excluded from the simulated flush operation, wherein the flushing further comprises performing:

the actual flush operation with the first and second transaction data and the not-flushed-in-simulation second write data excluded from the actual flush operation, when the fifth calculated space is equal to or larger than the first total size information; and the actual flush operation with the second transaction data and the not-flushed-in-simulation second write data excluded from the actual flush operation, when the fifth calculated space is smaller than the first total size information, and wherein the not-flushed-in-simulation second write data is to be excluded from the actual flush operation among the second write data stored in the write buffer.

* * * * *